US010800270B1

(12) United States Patent
Kuo

(10) Patent No.: US 10,800,270 B1
(45) Date of Patent: Oct. 13, 2020

(54) ENCLOSED ELECTRIC MOTORCYCLE

(71) Applicant: Ming Chuan Kuo, Cerritos, CA (US)

(72) Inventor: Ming Chuan Kuo, Cerritos, CA (US)

( * ) Notice: Subject to any disclaimer, the term of this patent is extended or adjusted under 35 U.S.C. 154(b) by 0 days.

(21) Appl. No.: 16/871,675

(22) Filed: May 11, 2020

(51) Int. Cl.
| | | |
|---|---|---|
| *B62H 1/02* | (2006.01) | |
| *B60L 50/60* | (2019.01) | |
| *B62J 17/086* | (2020.01) | |
| *B62H 5/04* | (2006.01) | |
| *B60L 50/64* | (2019.01) | |
| *B62J 27/20* | (2020.01) | |
| *B60R 22/14* | (2006.01) | |
| *B60T 8/1755* | (2006.01) | |
| *B62J 27/10* | (2020.01) | |
| *B60R 21/00* | (2006.01) | |

(52) U.S. Cl.
CPC ............. *B60L 50/66* (2019.02); *B60L 50/64* (2019.02); *B60R 22/14* (2013.01); *B60T 8/17554* (2013.01); *B62H 1/02* (2013.01); *B62H 5/04* (2013.01); *B62J 17/086* (2020.02); *B62J 27/10* (2020.02); *B62J 27/20* (2020.02); *B60R 2021/0088* (2013.01); *B60R 2325/306* (2013.01); *B62K 2204/00* (2013.01)

(58) Field of Classification Search
CPC .......... B60L 50/66; B60L 50/64; B62H 5/04; B62H 1/02; B62J 17/086; B62J 27/10; B62J 27/20; B60R 22/14; B60R 2325/306; B60R 2021/0088; B60T 8/17554; B62K 2204/00

See application file for complete search history.

(56) References Cited

U.S. PATENT DOCUMENTS

| | | | | |
|---|---|---|---|---|
| 5,048,864 A | * | 9/1991 | Geiger | B62H 1/12 280/755 |
| 5,181,740 A | * | 1/1993 | Horn | B62D 37/00 180/21 |
| 5,401,055 A | * | 3/1995 | Pham | B62D 61/02 180/209 |
| 5,685,388 A | * | 11/1997 | Bothwell | B62K 11/00 180/219 |
| 5,904,392 A | * | 5/1999 | Mainwal | B62J 17/08 296/78.1 |
| 6,637,763 B2 | * | 10/2003 | Kuo | B62H 1/12 280/209 |
| 6,685,208 B1 | * | 2/2004 | Cowie | B62H 1/10 280/293 |
| 6,942,053 B2 | * | 9/2005 | Hinton | B62D 61/04 180/209 |
| 7,357,416 B2 | * | 4/2008 | Wagner | B62H 1/12 280/5.506 |

(Continued)

*Primary Examiner* — Jacob B Meyer

(57) ABSTRACT

An improved enclosed electric motorcycle has an electric motor directly driving the rear wheel with a chain or a belt. A pair of steering handles and an accelerator foot pedal enables a driver to drive the motorcycle like an automobile. The pair of the landing wheel assemblies individually has a take-up assembly to reduce their sprung weights, and has an electric motor to increase reliability. By adding a pair of anti-skid wheels, the driver can avoid many accidents. An inflatable safety belt and a pair of side airbags will protect the driver in an accident. If the battery pack explodes, it will be ejected away from the motorcycle to protect the driver. A drive-in electric engaging device enables the driver to drive the motorcycle to engage with a stationary charging station for charging its battery pack while parking.

19 Claims, 9 Drawing Sheets

(56) References Cited

U.S. PATENT DOCUMENTS

| | | | | |
|---|---|---|---|---|
| D663,242 S * | 7/2012 | Zhang | ............................ | D12/110 |
| 8,480,111 B1 * | 7/2013 | Kuo | ........................... | B62H 1/00 |
| | | | | 280/293 |
| 10,583,881 B2 * | 3/2020 | Yeo | ............................ | B62H 1/12 |
| 2006/0175110 A1 * | 8/2006 | Lin | ....................... | B62K 11/007 |
| | | | | 180/219 |
| 2013/0281249 A1 * | 10/2013 | Mimura | .................. | B62K 5/027 |
| | | | | 475/150 |
| 2018/0118296 A1 * | 5/2018 | Rinda | ....................... | B62J 17/08 |
| 2018/0154965 A1 * | 6/2018 | Yeo | ............................ | B62J 17/04 |
| 2018/0154966 A1 * | 6/2018 | Yeo | ........................... | B62K 25/04 |
| 2018/0208261 A1 * | 7/2018 | Chen | ......................... | B62H 1/12 |

\* cited by examiner

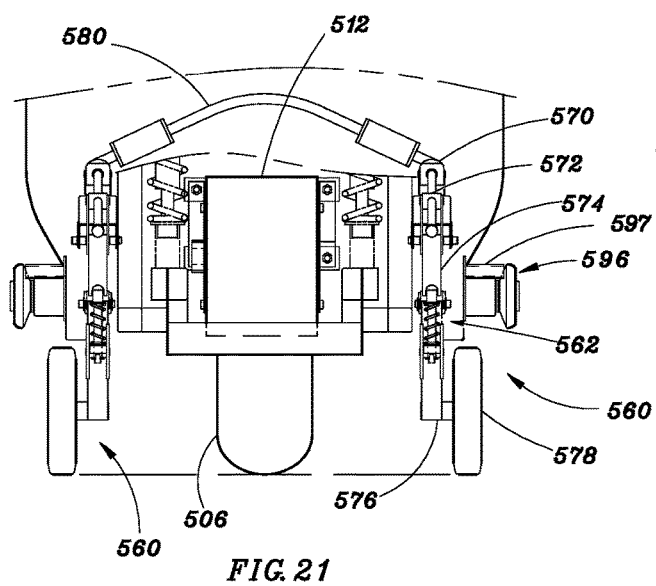
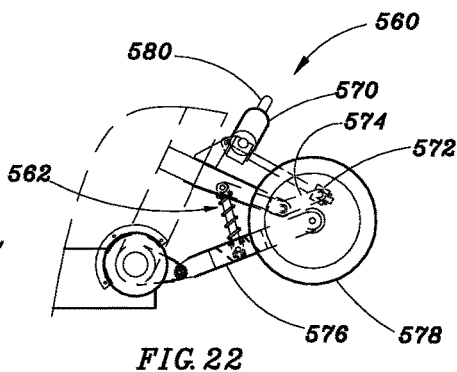
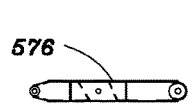
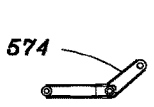
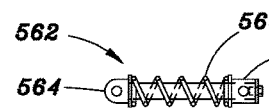
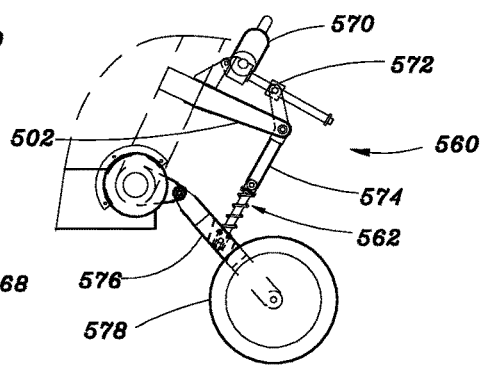
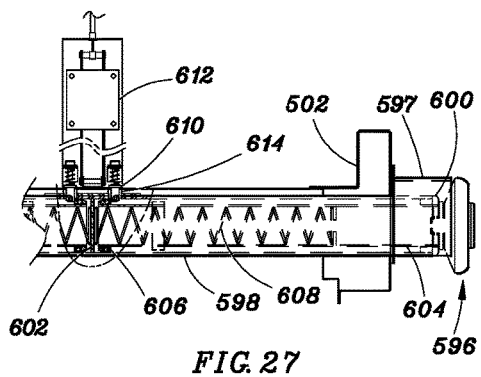
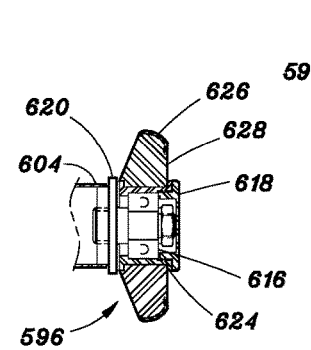
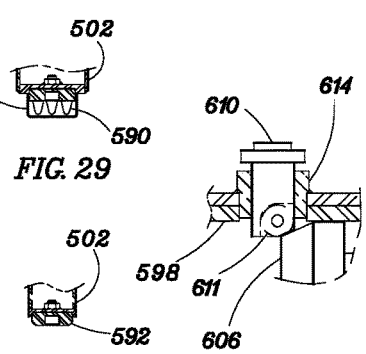
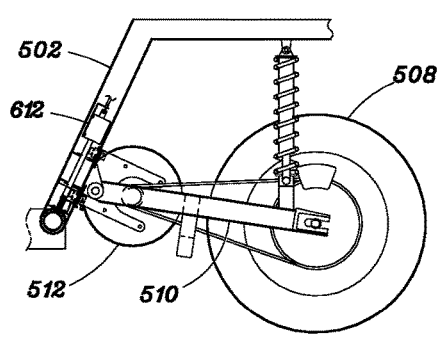
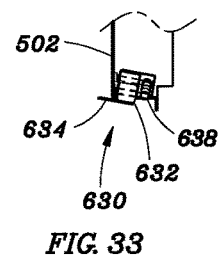
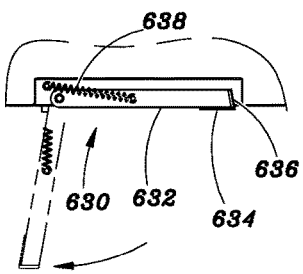

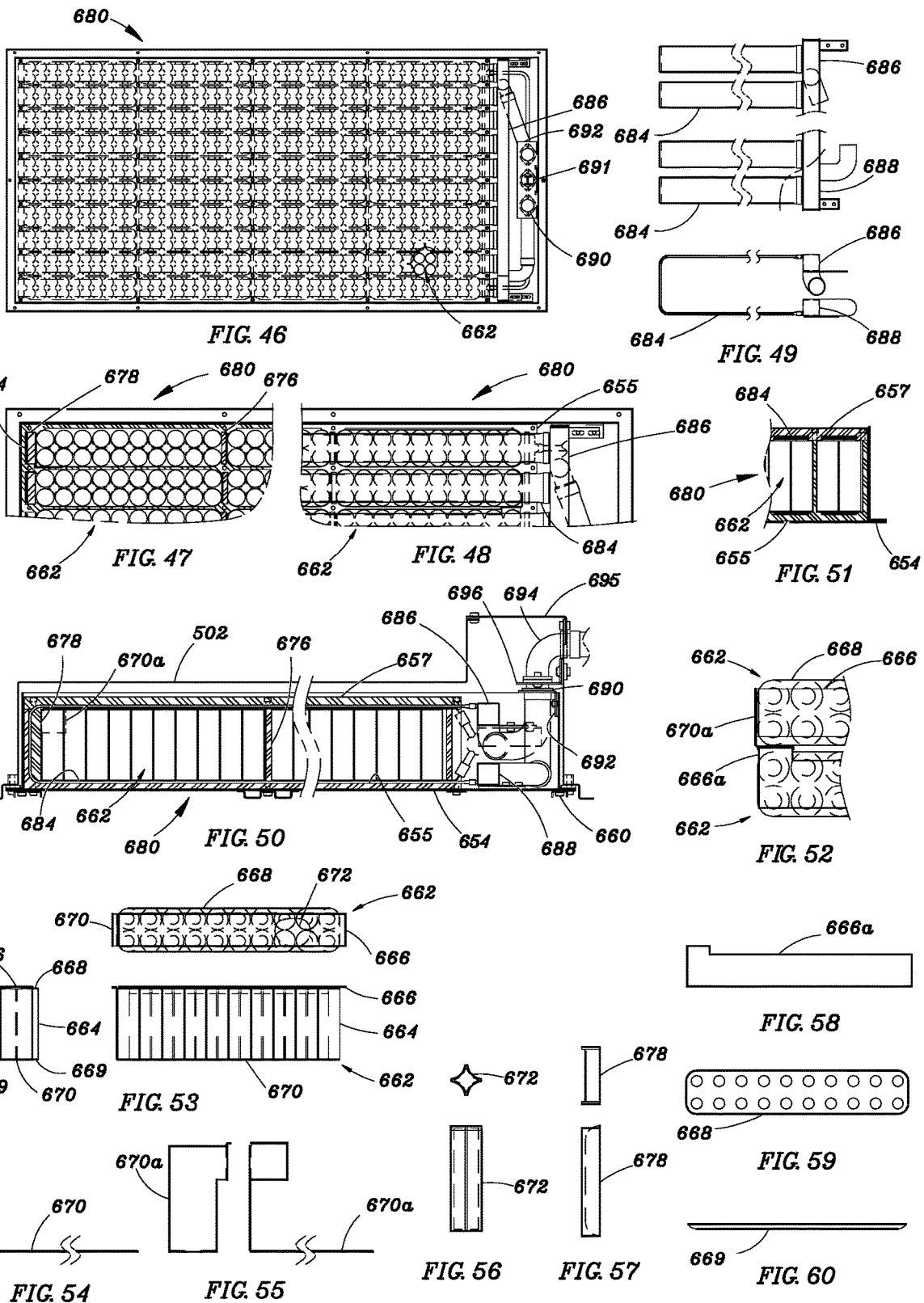

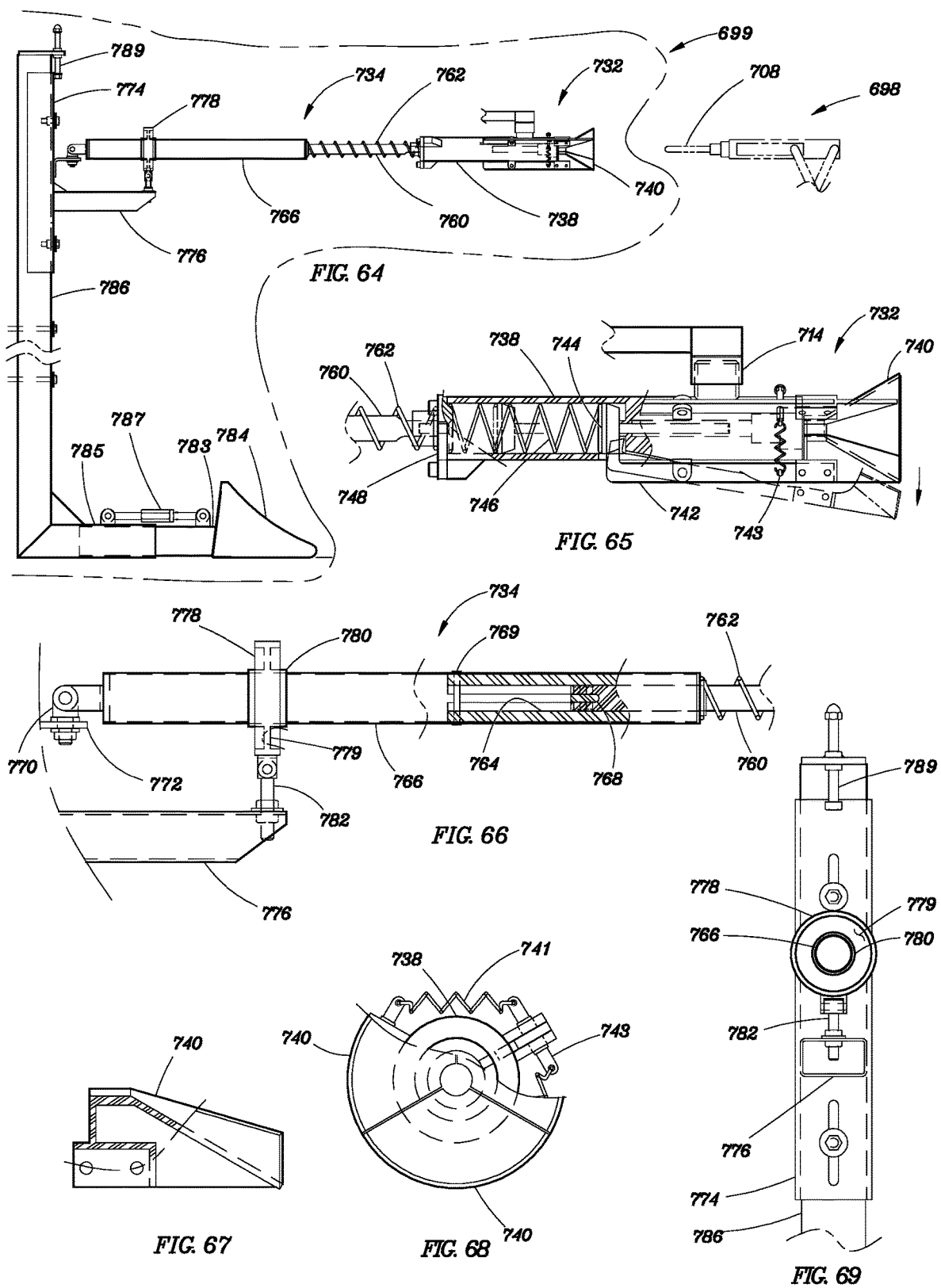

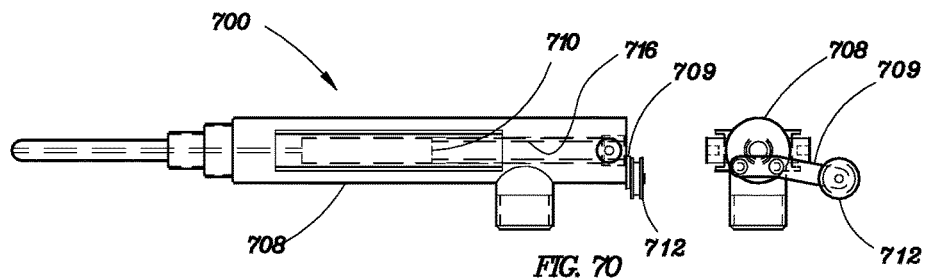
FIG. 70
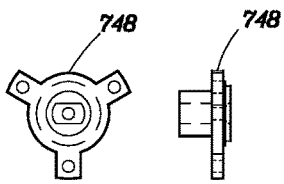
FIG. 71
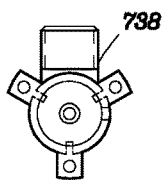
FIG. 72
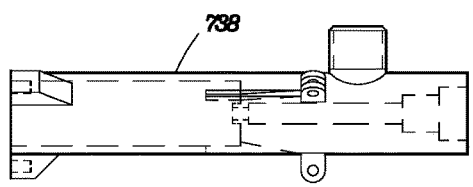
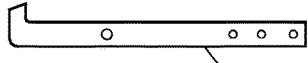
FIG. 73
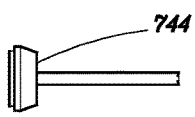
FIG. 74
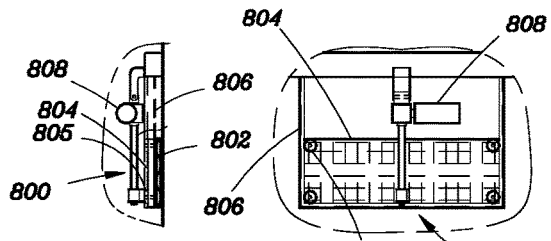
FIG. 75
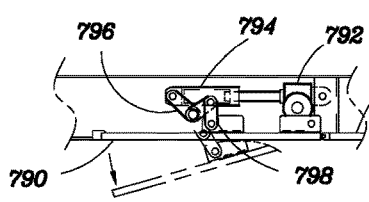
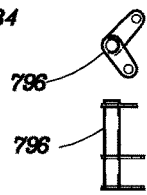
FIG. 77
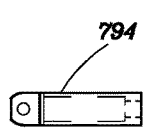
FIG. 78
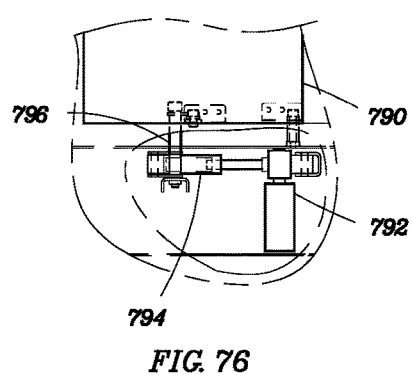
FIG. 76
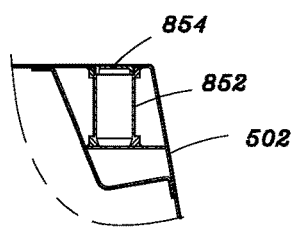
FIG. 80
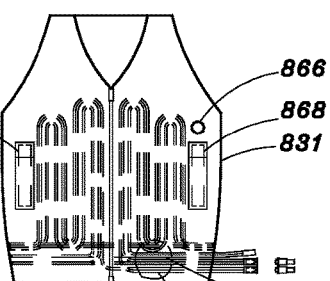
FIG. 82
FIG. 79
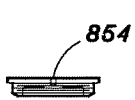
FIG. 81
FIG. 83

ENCLOSED ELECTRIC MOTORCYCLE

CROSS REFERENCE TO RELATED APPLICATION

This application claims priority of Provisional Patent Application No. 62/908,885 filed Oct. 1, 2019.

TECHNICAL FIELD

The present invention is specifically for improvements to an enclosed electric motorcycle having entrance doors and landing wheels to emulate automobile-like driving.

BACKGROUND OF THE INVENTION

Previously, many different types of motorcycles have been used with most prior art including stabilizing outrigger wheels to eliminate the need for the driver to touch the road with his feet when stopped or moving very slowly. Enclosures have been employed to protect the motorcycle driver from the adverse environmental conditions.

A search of the prior art did not disclose any patents that possess the combined novelty of the instant invention except my previous U.S. Pat. No. 8,480,111 B2, to which these improvements herein are specifically directed. The motorcycle presented in the previous patent has some vital drawbacks and does not provide adequate safety features to protect a driver. With the improvements, a driver can enjoy better driving experiences while mitigating self-inflicted accidents due to careless driving, and minimizing injuries if should unavoidable accidents occur.

The basic elements of the motorcycle include a structural frame, a pair of tandem wheels, an electric motor, a handlebar assembly, a brake foot pedal, an accelerator foot pedal, a driver seat, a pair of landing wheels, automatic and manual controllers to extend the landing wheels, a battery pack, a drive-in electric engaging device, and an enclosure with a pair of entrance doors.

BRIEF SUMMARY OF THE INVENTION

The invention is an eco-friendly motorcycle, which drives as easily as an automobile without emitting any pollutants and protects its driver from the adverse conditions outside. With its narrow body, two of the motorcycle can drive safely side by side in one car lane to speed up traffic during rush hour. What the government needs to do is providing a middle dividing line on each car lane in congested sections. The improvement of traffic in busy cities will have tremendous benefits for their residents: saving their precious time in commuting while enjoying better air quality.

As a motorcycle, it has inherent advantages over automobiles: better performance, requiring less space to park, lighter weights hence requiring less road maintenance, nimbler to travel, requiring less energy to operate, and cheaper to own and maintain. Hopefully, the motorcycle would be accepted by many people as their daily transportation and lead them to an environment-conscientious lifestyle to help mitigate the global climate change.

The primary object of the invention is to improve the previous patent while still retaining the basic features of my original invention. The major improvements are numbered and briefly explained in the following.

(1) Rear wheel drive: There is a more compact motor available to directly drive the rear wheel with a chain or a belt. It not only saves space, but also makes the drive more efficient. The gear box in the previous patent is eliminated.

(2) Handlebar assembly: The handlebar assembly is totally redesigned. There is a pair of steering handles individually mounted at each end of a steering bar. A driver holds the pair of steering handles to steer the front wheel. Both steering handles are oriented upwards. That moves the elbows of the driver downward instead of sideward, making more room for the driver inside the enclosure. A hand releasable lock on the steering bar enables a driver to easily adjust the orientations of the steering handles for driving comfort.

(3) Landing wheel assembly: The spring-loaded take-up rod assembly of each landing wheel assembly in the previous patent is relocated to connect between the wheel leg and the fork arm, reducing the sprung weight of each landing wheel assembly. Instead of one electric motor driving both landing wheel assemblies in the previous patent, each landing wheel assembly has its own motor. The motors of both landing wheel assemblies are connected with a flexible shaft, enabling them to work together to increase efficiency and reliability.

(4) Lower skid post: Each of the lower skid posts in the previous patent is modified by adding a small anti-skid wheel to its outer end. The anti-skid wheel will prevent accidents in the event of landing wheel failure during a stop. In an accident, before stopping, the motorcycle will start to lean sideways, and its sensors will automatically extend the pair of lower skid posts out. The anti-skid wheel on the leaning side will touch the ground, preventing the motorcycle from tipping over. As soon as the anti-skid wheel touches the ground, it rotates to let the motorcycle keep moving forward until the motorcycle completely stops. Without the anti-skid wheel, the post head will drag on the ground, causing the motorcycle to sway to its side that will likely create accidents with neighboring vehicles.

(5) Emergency kickstands: As part of the improvements, a pair of emergency kickstands is added. Individually mounted on each side of the motorcycle, they will support the motorcycle on the ground when its landing wheels fail. Only one kickstand is needed for each occasion, but a driver has the choice of which kickstand to be used depending on the ground conditions.

(6) Battery pack: In the previous patent, the battery pack 650 for driving a motorcycle was merely mentioned. The improvement is to construct a battery pack 650, and mount the battery pack 650 in a cavity inside the bottom frame of the motorcycle using screws of predetermined strengths. If the battery explodes in an accident, the pack frame will break away and eject far from the motorcycle, preventing the driver from the imminent danger. The battery pack 650 will also lower the center of gravity of the motorcycle enhancing its performance.

(7) Drive-in electric engaging device: A new device enables a driver to drive a motorcycle toward a stationary charging station and engage it with an electric charging device mounted in the motorcycle. It is useful for any driver who has a place such as a garage to park a motorcycle and charge its battery pack 650 at the same time.

(8) Vent window: The vent window is located in front of a fixed window on each entrance door of the motorcycle. The vent window hinges at its rear edge, and opens outward on its front side by a power drive, enabling the air to rush in dynamically from outside, as the motorcycle is moving. In the previous patent, the vent window has a vertical hinge located at its front edge and manually operated to open inward.

(9) Rear window: In the previous patent, the rear window was briefly described. The improvement of the rear window is power operation, making it easier for a driver to control.

There are other improvements not mentioned yet, but will be explained in Detailed Description.

These and other objects and advantages of the improvements to the previous invention will become apparent from the subsequent detailed description of the preferred embodiment and the appended claims taken in conjunction with the accompanying drawings.

BRIEF DESCRIPTION OF THE SEVERAL VIEWS OF THE DRAWING

FIG. 4 is a front cross-sectional view of the improved enclosed electric motorcycle in the preferred embodiment.

FIG. 5 is a rear view of the improved enclosed electric motorcycle in the preferred embodiment. The partially extended landing wheels at the preset position are shown in phantom lines when the low speed cruising control is on.

FIG. 21 is a rear view of the landing wheel assemblies in the extended position.

FIG. 22 is a partial side view of the landing wheel assembly in the retracted position.

FIG. 23 is a partial side view of the landing wheel assembly in the extended position.

FIG. 24 is a side view of the wheel leg.

FIG. 25 is a side view of the fork arm.

FIG. 26 is a side view of the take-up assembly.

FIG. 27 is a partial front view of the left lower skid post.

FIG. 28 is a cross-sectional view of the anti-skid wheel.

FIG. 29 is a cross-sectional top view of the front skid head and its protective cover.

FIG. 30 is a cross-sectional top view of the rear skid head.

FIG. 31 is a front view of the left plunger and the needle bearing engaging with the post collar of the post tube. The rest of parts engaged with them are not shown for clarity.

FIG. 32 is a partial side view of the rear wheel drive.

FIG. 33 is an end view of the left emergency kickstand in the retracted position.

FIG. 34 is a side view of the left emergency kickstand in the retracted position. The extended position is shown in phantom lines.

FIG. 46 is a top view of the pack frame assembly.

FIG. 47 is a partial cross-sectional top view of the front right corner of the pack frame assembly.

FIG. 48 is a partial top view of the rear right corner of the pack frame assembly without the pack cover for clarity.

FIG. 49 is a partial side view of the coolant hoses assembled with the manifolds, and their top view.

FIG. 50 is a partial cross-sectional side view of the pack frame assembly mounted on the structural frame of the motorcycle.

FIG. 51 is a partial front cross-sectional view of the right side of the pack frame assembly.

FIG. 52 is a partial top view of both the fourth module in a compartment of the pack case and its connected first module laid in the next compartment. The pack case is not shown for clarity.

FIG. 53 is an isometric view of the battery inner module.

FIG. 54 is a side view of the negative strip for the battery inner module.

FIG. 55 is a side view and a front view of the negative strip of the fourth module in a compartment of the pack case.

FIG. 56 is a side view of the capsule and its top view.

FIG. 57 is a side view of the coolant hose guide and its top view.

FIG. 58 is a top view of the positive strip for the first module in a compartment of the pack case.

FIG. 59 is a top view of the insulator.

FIG. 60 is a top view of the cushion.

FIG. 64 is a side view of the female electric engaging device. The front part of the male device is shown in phantom lines for reference.

FIG. 65 is a side view of the receptacle assembly and the front part of the receptacle support. The fully engaged position with the male device is shown in phantom lines.

FIG. 66 is a partial side view of the receptacle support.

FIG. 67 is a side view of the conical face segment head.

FIG. 68 is a front view of the receptacle assembly in the guiding position.

FIG. 69 is a cross-sectional front view of the receptacle support.

FIG. 70 is a side view of the plug assembly, and its end view on the right.

FIG. 71 is an end view of the receptacle end plate, and its side view on the right.

FIG. 72 is an end view of the receptacle body, and its side view on the right.

FIG. 73 is a side view of the locking arm.

FIG. 74 is a side view of the lock head.

FIG. 75 is a cross-sectional side view of the rear window, and its front view on the right.

FIG. 76 is a cross-sectional side view of the vent window, and its top view above it.

FIG. 77 is a side view of the actuating arm and its top view.

FIG. 78 is a side view of the actuating rod.

FIG. 79 is a side view of the tipping lever and the lever cover.

FIG. 80 is a cross-sectional front view of the prying socket on the structural frame of the motorcycle.

FIG. 81 is a side view of the prying socket cap.

FIG. 82 is a partial side view of the left side airbag, the inflatable belt, the regular belt connecting to the belt retractor, and the flat hose connecting to the inflator. The expanded side airbag is shown in phantom lines.

FIG. 83 is a front view of the driver vest.

DETAILED DESCRIPTION OF THE INVENTION

Figure 1:
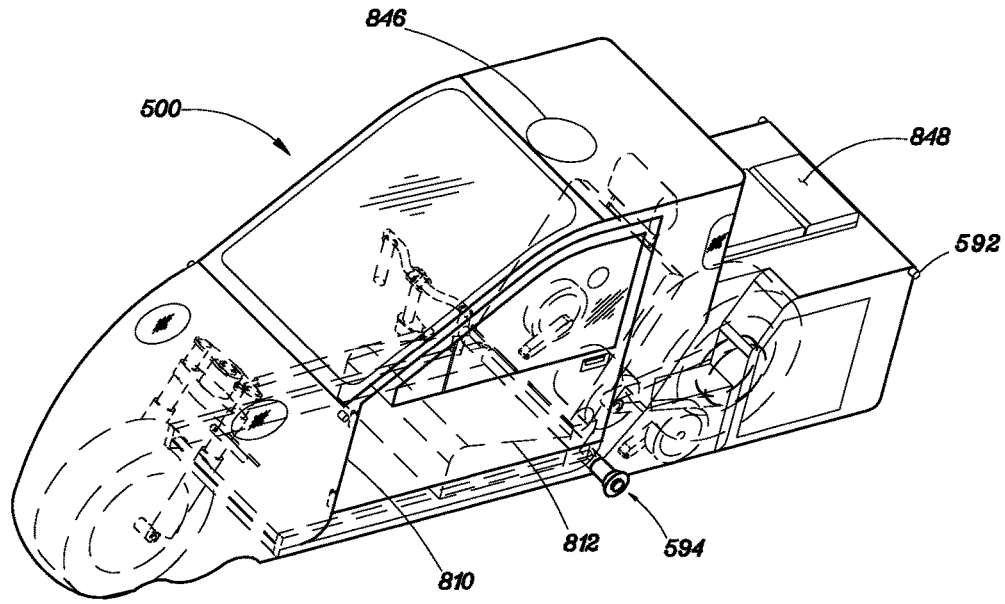
FIG. 1 is a partial isometric view of the improved enclosed electric motorcycle in the preferred embodiment.

The best mode for carrying out the invention is presented in terms of a preferred embodiment. This preferred embodiment of an improved enclosed electric motorcycle 500 is shown in FIGS. 1 through 83 and is comprised of the following; a structural frame 502, a front wheel 506, a rear wheel 508, an electric motor 512, a handlebar assembly 520, a brake foot pedal 820, an accelerator foot pedal 818, a driver seat 812, a pair of electrically actuated landing wheels 578, a pair of emergency kickstands 630, a battery pack 650, sensors and drive controls 511, a drive-in electric engaging device for charging the battery pack 650, and an enclosure 504 including a pair of entrance doors 810. The frame of the enclosure 504 is part of the structural frame 502. The following is the detailed description starting the improvements mentioned in the section of Brief Summary of the Invention and identified with the same numbers. In all the following description, the front of a part refers to the side toward the front end of the motorcycle, and the rear, right and left of the part are naturally defined by the front.

(1) Rear wheel drive: The main pictorial view is shown in FIG. 32. An electric motor 512 directly drives the rear wheel 508 of the motorcycle 500 with a chain or a belt, thus saving space and making the drive more efficient. The drive shaft of the motor 512 has to be placed higher than the rear wheel axle to keep the motor housing above the bottom frame 502 of the motorcycle 500. Accordingly, the hinge of the rear wheel pivot fork 510 has to be raised to line up with the motor shaft and the rear axle, maximizing the driving efficiency of the motor 512 as shown in FIG. 32. The motor 512 incorporates a regenerative braking system to save energy. It also provides a slow reverse for the motorcycle to move backward. When the motorcycle 500 is moving backwards, its landing wheels 578 will always be in the extended position to touch the ground as shown in FIGS. 21 and 23.

(2) Handlebar assembly: The main pictorial views are shown in FIGS. 4, and 9 through 20. The handlebar assembly 520 consists of a round steering bar 522, a pair of steering handles 524, a steering shaft 526, an upper housing 528 and a lower housing 530 fastened together with screws, a bar locking arm 532, a locking cam 534 with a handle, a leaf spring 531, an eye bolt 533, an eye bolt spring 533, a torque arm 536, a shaft lock 539, a stationary bearing 538, and a connecting rod 537 with a spherical rod end 546 on each of its ends.

Figures 4, 5:
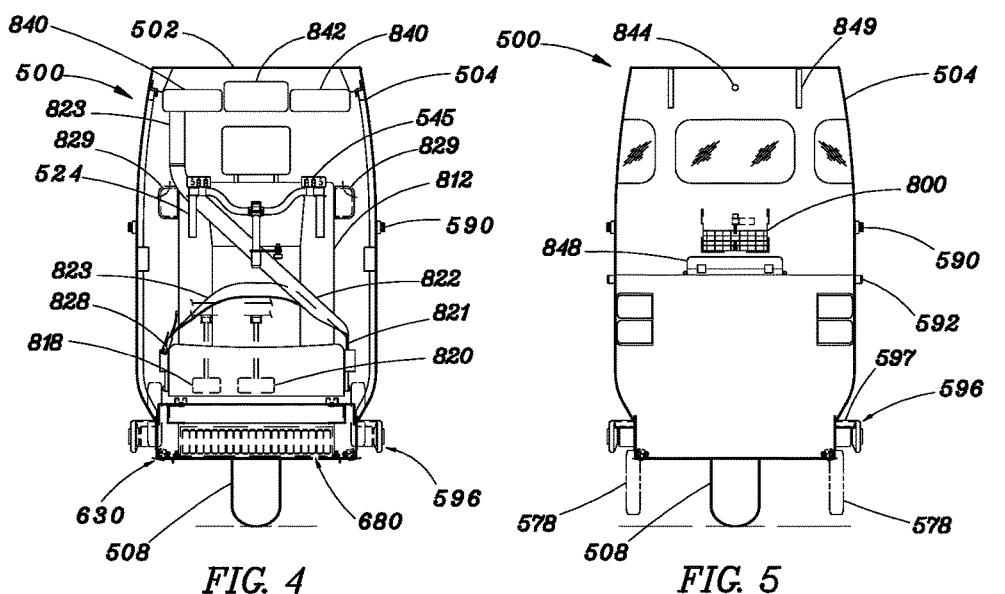
Figures 13, 14:
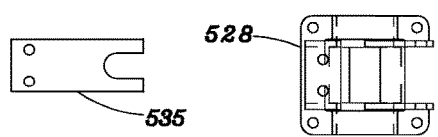
FIG. 13 is a top view of the leaf spring.
FIG. 14 is a side view of the upper housing and its top view.
Figure 15:
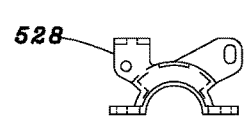
FIG. 15 is a front view of the teeth circular sector on the steering bar.
Figure 16:
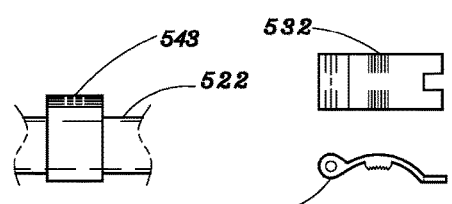
FIG. 16 is a side view of the bar locking arm and its top view.
Figure 17:
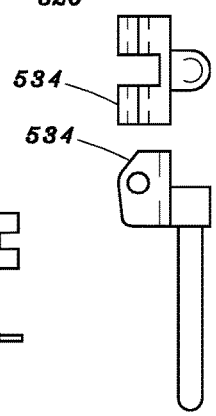
FIG. 17 is a side view of the locking cam and its top view.
Figure 19:
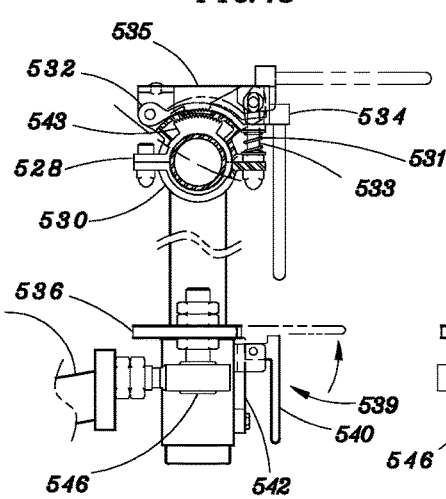
FIG. 19 is a partial cross-sectional side view of the handlebar assembly showing the bar locking arm and the locking cam in the lock positions, and the shaft lock in the unlocked position. The unlocked positions of the bar locking arm and the locking cam, and the lock position of the shaft lock are shown in phantom lines. The steering shaft is shown in the vertical position for easy understanding.
Figure 20:
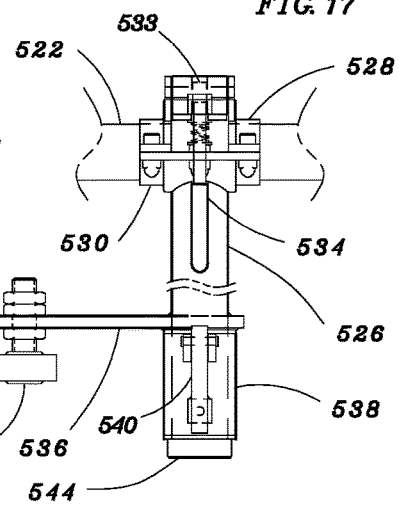
FIG. 20 is a partial rear view of the handlebar assembly.
Figure 35:
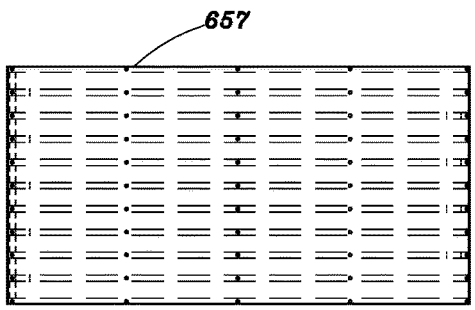
FIG. 35 is a top view of the pack cover.
Figure 36:
FIG. 36 is a partial front view of the pack cover.
Figure 37:
FIG. 37 is a partial side view of the pack cover.
Figure 38:
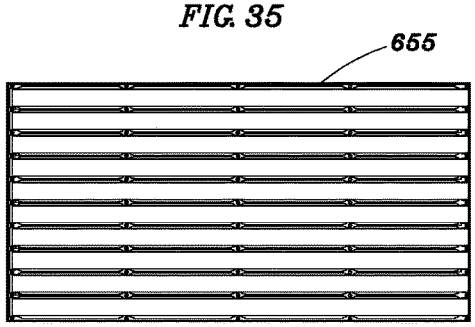
FIG. 38 is a top view of the pack case.
Figure 39:
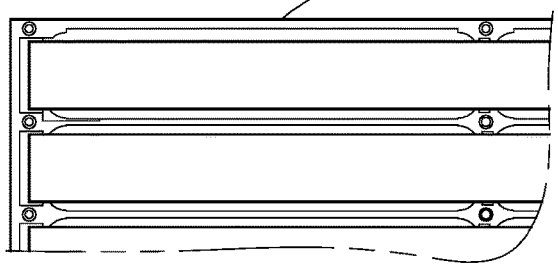
FIG. 39 is a partial top view of the front right corner of the pack case.
Figure 40:
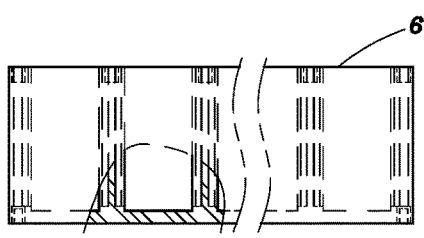
FIG. 40 is a partial front view of the pack case.
Figure 41:
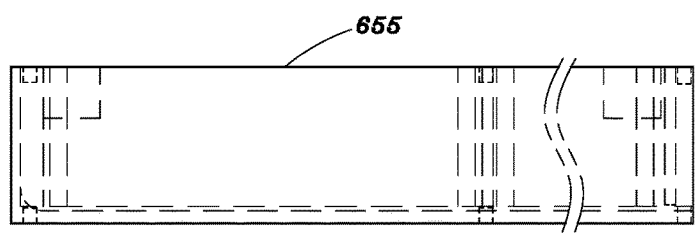
FIG. 41 is a partial side view of the pack case.

For easy understanding, the steering shaft 526 is oriented to the vertical as shown in FIGS. 19 and 20. The pair of steering handles 524 mounts individually at each end of the steering bar 522, and points generally downward. In order to attain optimal drive position without altering the seat position, the middle of the steering bar 522 must be at the same height as the intended grip areas on the steering handles 524. Accordingly, both ends of the steering bar 522 have to be bent to a higher level for mounting the steering handles 524 as shown in FIG. 4. The middle part of the steering bar 522 has a short section with a larger diameter. On the short section it has a circular sector 543 with a bigger radius, protruding radially upward. Triangular locking teeth are formed axially on the outer surface of the circular sector 543. The steering bar 522 mounts transversely on the lock housings 528, 530, with its middle section positioned therein so that the steering bar 522 is able to rotate on its axis, but restrained from moving axially. The inner radial walls of the upper housing 528 limit the rotation of the steering bar 522 as shown in FIGS. 14 and 19. The lower housing 530 mounts on the top of the steering shaft 526.

The bar locking arm 532 hinges on the front side of the upper housing 528, and the elevation of its hinge is at the same level as the locking teeth on the circular sector 543. The bar locking arm 532 extends rearward and its middle part has a teeth head underneath to engage with the teeth on the circular sector 543. The upper housing 528 has an opening allowing the teeth head on the bar locking arm 532 to enter. The rear end of the bar locking arm 532 is flat horizontally and the upper face of the flat end is to engage with the locking cam 534. In the middle of its width the bar locking arm 532 has an open slot at its flat end to provide a space for the eye bolt 533.

In the middle of its width the locking cam 534 has an open slot at its front side for engaging with the eye bolt 533 using a pin. The pin extends beyond the sides of the locking cam 534 and its ends engage with vertical slots respectively in the pair of the side plates on the upper housing 528. The eye bolt is secured with its lower end on the flange plate of the lower housing 530 using a nut and a cap nut. The compression spring 531 is placed around the shank of the eye bot 533 and has a washer at each end to rest on the nut and the bar locking arm 532 respectively. Using both nut and cap nut the height of the eye bolt 533 can be accurately adjusted to ensure the bar locking arm 532 properly locking the steering bar 522 from rotation.

The height of the hinge on the locking cam 534 from the rear upper face of the bar locking arm 532 is determined by the unlocking angle of the bar locking arm 532 and the radius of the ear lobe of the locking cam 534 at the hinge. First, the bar locking arm 532 is rotated to the unlocking angle, and a parallel line is drawn above its rear upper face with a distance equal to the radius of the ear lobe. The intersecting point of the parallel line and the vertical centerline of the eye bolt 533 is the hinge center of the locking cam 534 and its height from the rear upper face of the bar locking arm 532 in the locking position is the hinge height.

The cross-sectional shape of the locking cam 534 will be described on the side view as follows. The lower rear face of the locking cam 534 is horizontal and situated below its hinge with a vertical distance equal to the hinge height. The lower front face is a circular curve with the center at the hinge and a radius equal to the hinge height. Below the hinge, it has a lower flat face tangent to the hinge ear lobe and having an angle with the vertical equal to the unlocking angle. A round corner should be provided at the intersection between the lower flat face and the lower front circular curve. The rear face of the locking cam 534 is vertical. The upper rear face of the locking cam 534 is horizontal and situated above the hinge with a distance the same as that between the hinge and the rear face. The upper front face of the locking cam 534 is a flat face tangent to the hinge ear lobe. The rear face of the locking cam 534 protrudes out at its middle to provide a base for mounting the locking cam handle below.

A flat leaf spring 535 has a width the same as that of the locking cam 534 and mounts its front side horizontally on a bridge plate of the upper housing 528. The rear part of the leaf spring 535 rests on the upper face of the locking cam 534 under pressure, holding the locking cam 534 in the lock position. At the middle of its width, the leaf spring has an open slot at its rear side to provide a space for the locking cam handle when the locking cam 534 is in the unlock position.

To adjust the orientation of the steering handles 524, a driver pulls the locking cam handle upward 90 degrees, the bar locking arm 532 will be tilted up to the unlock position by the eye bolt spring 531 and stay in the position, allowing the driver to adjust the orientation of the steering handles 524. After the adjustment, by rotating the locking cam handle back the bar locking arm 532 will lock the steering handles 524 again. Therefore, the steering bar 522 with the teeth circular sector 543, both upper housing 528 and the lower housing 530, the bar locking arm 532, the locking cam 534, the eye bolt 533, the eye bolt spring 531, and the leaf spring 535 form a hand releasable lock, making the adjustment of the steering handles 524 easy and safe. A small control board 545 is mounted on each end of the steering bar 522, and control switches are mounted on the control board 545, enabling a driver to thumb operate.

Figure 11:
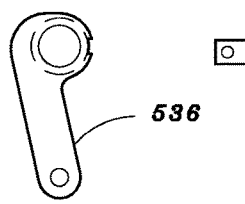
FIG. 11 is a top view of the torque arm.
Figure 12:
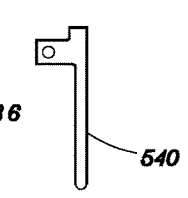
FIG. 12 is a side view of the shaft locking arm.
Figure 10:
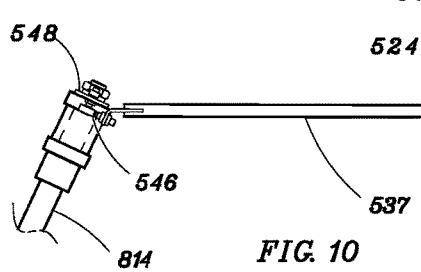
FIG. 10 is a side view of the handlebar assembly.
Figure 18:
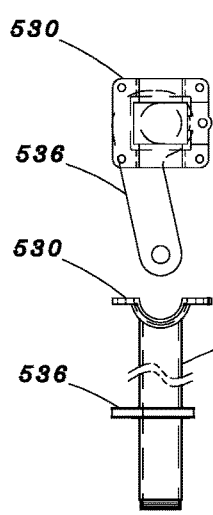
FIG. 18 is a side view of a weldment consisting of the steering shaft, the torque arm, and the lower housing. A top view of the weldment is shown above the side view.

The torque arm 536 welds its upper face to the steering shaft 526. The torque arm 536 has a raised round flat face underneath for engaging with the stationary bearing 538, a locking slot at its rear side for engaging with the shaft lock 539, and a hole located on its left side for mounting the connecting rod 537. They are shown in FIGS. 11 and 18. The lower half of the steering shaft 526 mates with the stationary bearing 538, and is held in place axially by the torque arm 536 at the top and a blind end nut 544 at the bottom. The orientation of the steering shaft 526 could be slightly tilted toward the driver seat 812 from the vertical to enhance the driving comfort as shown in FIG. 10.

The shaft lock 539 is for locking the steering shaft at a position that the front wheel 506 points forward, enabling the landing wheels 578 to hold the motorcycle evenly on the ground during parking. The shaft lock 539 consists of a locking arm 540 and a leaf spring 542. The locking arm 540 is made of flat plate and hinges transversely on a protruded base on the housing of the stationary bearing 538 at a location near the top of the housing. The distances from the hinge center of the locking arm 540 to its front vertical edge and to its upper horizontal edge are equal. A locking head of the locking arm 540 extends upward from its upper horizontal edge at a location such that when the locking arm 540 is rotated upward 90 degrees, the locking head will engage in the slot of the torque arm 536, locking the steering shaft 526 in place. The handle of the locking arm 540 extends downward below its hinge. The leaf spring 542 mounts its lower end on a raised base protruded from the housing of the stationary bearing 538, and its upper end engages the entire front edge of the locking arm 540, holding the locking arm in place under pressure. When parking a motorcycle, the driver should set the front wheel pointed forward, and then rotate the locking arm 540 to lock the steering shaft. In the locked position, the leaf spring 542 will engage with the upper edge of the locking arm 540 and hold it in place.

The connecting rod 537 uses a spherical rod end 546 at each of its ends to connect the torque arm 536 to the upper arm 548 of the front wheel support. The spherical rod ends 546 must be individually parallel to the steering shaft 526 and the shaft of the front wheel support as shown in FIG. 10. The front wheel support must have stops to limit the maximum steering angles.

(3) Landing wheel assemblies: The main pictorial views are shown in FIGS. 21 through 26. There is a pair of landing wheel assemblies 560, one located on each side of the motorcycle 500. As the motorcycle is coming to stop, their landing wheels 578 will automatically extend to touch the ground at a preset speed to hold the motorcycle 500 in the upright position, and retract at another preset speed, as it is moving from stop, enabling a driver to drive the motorcycle 500 like an automobile. However, the motorcycle must have manual controls allowing a driver to override the automatic controls to raise or lower the landing wheels 578, when circumstances call for. The circumstances could be that when the driver wants to start or stop the motorcycle on a curve road, or during a straight driving when the driver wants to apply the brake hard to stop the motorcycle quickly to avoid an accident. But the manual controls must be operable under preset safe speed limits.

As part of improvement, each landing wheel assembly 560 mounts directly on the structural frame 502, instead of a support arm as described in the previous patent. Each landing wheel assembly 560 consists of a motorized worm gear drive 570 with a screw output shaft, a nut 572, a fork arm 574, a take-up assembly 562, a wheel leg 576, and a landing wheel 578.

The take-up assembly 562 is new and comprises a round take-up rod 564, a compression spring 566 with a spring seat at each end, and a pivot block 568. The take-up rod 564 has a hinge hole at its head with a shoulder to seat the spring 566, and a blind thread hole at its tail end. The pivot block 568 has a hole through its center to mate with the take-up rod 564, and a pair of short blind holes, one on each of its vertical sides. The take-up rod 564 places its rod through the spring 566 and the pivot block 568, and a screw and washer are installed at its end to hold the assembly together as shown in FIG. 26. The spring 566 is under a pre-set compression to maximize the landing performance.

Since the motion of each landing wheel 578 is in a longitudinal vertical plane, all hinges on the landing wheel assembly 560 are in the transverse direction. The head of the worm gear drive 570 hinges on the structural frame 502 and its screw shaft engages with the nut 572. The nut 572 hinges on the fork of the fork arm 574 using two stub pins. The middle part of the fork arm 574 hinges on the structural frame 502 and its lower end hinges on the hinge hole of the take-up assembly 562. The pivot block 568 of the take-up assembly 562 hinges on the middle part of the wheel leg 576 using two stub pins. The wheel leg 576 has its upper end hinging on the structural frame 502, and its lower end supporting the landing wheel 578.

When the output screw shaft of the worm gear drive 570 rotates, it drives the nut 572 rotating the fork arm 574. The rotation of the fork arm 574 moves the take-up assembly 562 to rotate the wheel leg 576 causing the landing wheel 578 to move up and down. When a motorcycle 500 is coming to stop on an uneven spot, each landing wheel 578 will bounce on the ground, causing the spring 566 to deflect, and the take-up rod 564 to slide in the pivot block 568. The action of the take-up assembly 562 allows only the landing wheel 578 and the wheel leg 576 bouncing, instead of the entire landing wheel assembly described in the previous patent, improving the landing performance and reliability. Each worm gear drive will automatically stop, when each landing wheel 578 is coming to the landing and retracted positions. In the landed position, the two hinges of the take-up assembly 562 and the hinge of the fork arm 574 are lined up in a straight line as shown in FIG. 23. Therefore, any impact from road surfaces to the landing wheel 578 transmits through the hinge of the fork arm 574 directly to the structural frame 502. The worm gear drive 570 receives very little impact to avoid premature failures. Furthermore, in the landed position, the worm gear drive 570 has a maximum mechanical advantage to retract the landing wheel 578, when the landing wheel lands on a higher spot of the road.

A flexible shaft 580 connects to the shaft ends of the motors on both motorized worm gear drives 570, enabling both motors working together. Each motor is powerful enough to drive both landing wheels 578, in case one of the motors fails. Hence, the new design improves the driving reliability. But the failure of a motor will turn on a warning signal to alert for quick replacement. In the previous patent, there is only one motor driving both landing wheels.

(4) Skid posts and anti-skid wheels: The main pictorial views are shown in FIGS. 2, 3, and 27 through 31. The function of the three skid posts, front, rear, and lower, on each side of a motorcycle 500 in the previous patent remains the same, but there are some changes in their designs. The skid posts prevent the enclosure 504 of the motorcycle from touching ground when the motorcycle skids sideways in an accident. By design using teeth, the front post creates more friction on road surface during skidding, forcing the tail end of the motorcycle to turn to the front end with its front end trailing behind. If the motorcycle hits any objects before coming to a complete halt, the impact will come from behind the driver, but the driver is protected by the enclosure 504 and the seat frame to minimize injuries. The head 590 of the front skid post has a protective cover 591, which is breakable and disposable. To simplify their installation, the front skid head 590 and the rear skid head 592 are mounted directly on the structural frame 502 with a screw as shown in FIGS. 29, and 30, instead of mounting individually on a shock-absorbing body as described in the previous patent.

An important improvement is adding a small anti-skid wheel 596 to the end of each lower skid post 594. The hub locknut 618 of the anti-skid wheel 596 protrudes out to work as a skid head. The anti-skid wheel 596 mounts on a high speed bearing 616 supported by a shaft 620. The bearing 616 is capable to take radial and thrust loads. At its inner end, the shaft has a flange with a male thread end to screw into the end of the post tube 604, with the flange pressing tight against the post tube. The flange has a diameter larger than the post tube 604, allowing the flange to push against the structural frame 502, when the anti-skid wheel 596 is under a thrust force from the ground in an accident.

The inner ring of the bearing 616 is mounted on the shaft 620, and secured in place axially by a nut and a washer, mounted at the shaft end. The anti-skid wheel 596 mounts on the outer ring of the bearing 616, and is locked axially by the hub locknut 618, which has a male thread end engaging with a female thread in the hub's outer end to press its inner face on the outer ring. Besides the hub 624, the anti-skid wheel 596 also contains a wheel body 628, and a harden tread 626 with round outer corner. The inner side of the wheel body 628 is cone-shaped to reduce weight as shown in FIG. 28. The wheel body 628 could be made of lightweight alloy or strong plastics. To prevent foreign objects tangling on the inner neck of the anti-skid wheel 596, a wheel guard 597 of a half cylinder shell with the same radius as the anti-skid wheel mounts its inner side to the structural frame 502 to cover the front and upper sides of the inner neck.

Figures 6, 7, 8:
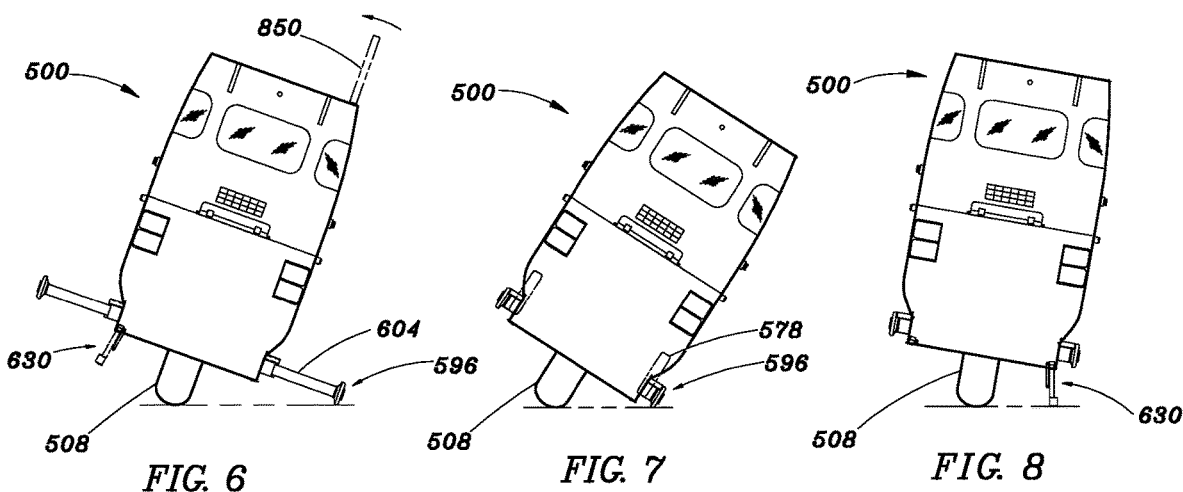
FIG. 6 is a rear view of the improved enclosed electric motorcycle supported on the ground by the anti-skid wheel on the tilted side with both lower skid posts in the extended position. The installed tipping lever and the deployed emergency kickstand are shown in phantom lines.
FIG. 7 is a rear view of the improved enclosed electric motorcycle tilting to have the anti-skid wheel on the tilted side touching the ground.
FIG. 8 is a rear view of the improved enclosed electric motorcycle supported on the ground by one of its emergency kickstands.
Figure 9:
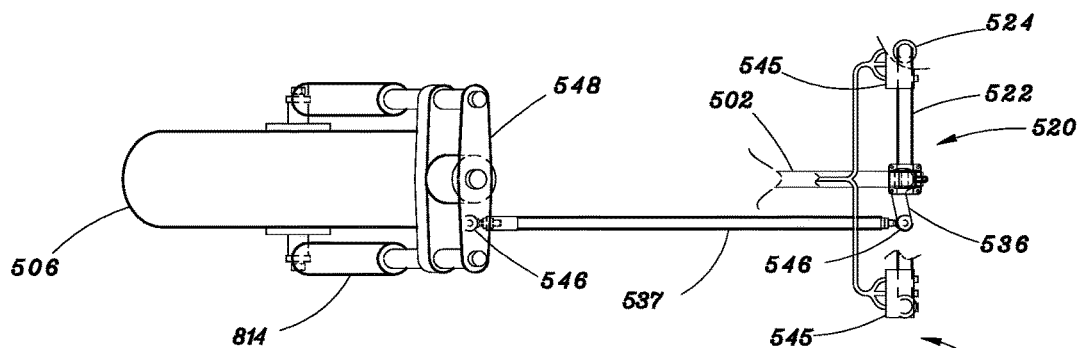
FIG. 9 is a top view of the handlebar assembly.

The anti-skid wheels 596 will prevent accidents when the landing wheels 578 fail to touch the ground during a stop as explained in the section of Brief Description of Invention. Besides, it will also prevent many self-inflicted accidents, when the motorcycle travels fast while making a turn. During the turning, the motorcycle could lean sideways far enough to have its bottom edge touching the ground, making it uncontrollable. But, just before that happens an anti-skid wheel will touch the ground and rotate to let the motorcycle keep moving. The rolling friction of the anti-skid wheel 596 will immediately slow down the motorcycle and make it steer more (smaller turning radius) that will generate additional centrifugal forces to pull the motorcycle away from the ground, enabling the driver to regain control as shown in FIG. 7.

The mounting of the post tube 604 on the structural frame 502 of the motorcycle is the same as the previous patent. The following is a brief description to help understand the concept. A piece of cylindrical structural tubing 598 is mounted on the structural frame 502, near its bottom. There is a guide collar 600 mounted using screws on each end of a structural tubing 598. The guide collar 600 has a smaller hole than the hole of the structural tubing 598. A bulkhead 602 places in the middle of the structural tubing 598 dividing it into two halves, each half for installing the left and right lower skid post 594 respectively.

The main body of each lower skid post 594 is a cylindrical post tube 604 with a post collar 606 mounted on its inner end and an anti-skid wheel 596 mounted on its outer end. There is a stop collar mounted on the surface of the post tube 604 limiting the travel of the post tube 604. The inner part of the post collar 606 is a taper. A compression post spring 608 is placed in the post tube 604 with its outer end against a bulkhead in the post tube 604, and its inner end against the partition bulkhead 602. The outer vertical face of the post collar 606 rests on one of the pair of spring-loaded plungers 610 connected to an electric solenoid 612, holding the post tube 604 in place against the spring 608.

Each plunger 610 has a round head at its top for seating a spring, and a shank with square cross section below. At the lower end of the shank it has a cavity for mounting a needle bearing 611. The bearing's outer edge lies even with the shank's outer face, and the bearing's lower edge lies even with the bottom of the shank. The needle bearing 611 has a thick outer ring to work as a wheel to engage with the taper of the post collar 606, providing low friction. The inner part of the shank's bottom is flat, and its outer part starting at the lower tangent point of the needle bearing 611 is a tilted surface parallel to the taper of the post collar 606 as shown in FIG. 31. When the post tube 604 slides in from outside, the post collar 606 will engage with the needle bearing 611 first and force the plunger 610 to retract until the engagement reaches the lower tangent point of the bearing 611, and then the post collar 606 slides on the bottom face of the plunger. After the post collar 606 passes the plunger 610, the plunger will return by its spring to lock the post tube 604 in place as shown in FIG. 27. There is a pair of plunger guides 614 mounted on the structural tubing 598, to mate with the plungers 610 respectively. The needle bearing 611 and the plunger guides 614 are newly added to improve the guiding function as shown in FIGS. 27 and 31.

The mounting of the spring-loaded plungers 610 and the push-pull electric solenoid 612 attached to them remains the same as the previous patent, but they are relocated to the structural frame 502 of the motorcycle 500 behind the driver seat as shown in FIG. 32. When the motorcycle is coming to stop, if the landing wheels 578 fail to land, sensors 511 will activate the electric solenoid 612 to pull the pair of plungers 610 disengaging with the pair of the lower skid posts 596, allowing the post springs 608 to push both lower skid posts 594 out until the stop collar on each post tube 604 hits the guide collar 600 respectively. As the motorcycle starts to lean sideways, the anti-skid wheel 596 on the leaning side will touch ground preventing the motorcycle from tipping over as shown in FIG. 6. Each lower skid post 594 can be reset by simply pushing it back until locked. The plungers 610 may also be pulled by hand through a remote cable to extend both lower skid posts 594 out, if needed.

(5) Emergency kickstands: The main pictorial views are shown in FIGS. 2, 8, 33, and 34. As part of the improvements, a pair of indispensable emergency kickstands 630 is added to the motorcycle 500. One kickstand 630 is located on each side of the motorcycle 500 and mounted inside the bottom of the structural frame 502, with its side plate exposed out to be reached by a driver. When the landing wheels 578 fail, the driver can deploy one of the kickstands 630 to stand the motorcycle as shown in FIG. 8.

Each kickstand assembly 630 consists of a kick bar 632 and a tension spring 638. The kick bar 632 has a hinge hole at its head, a landing plate 636 at its end, and a side plate 634 near the end. The head of the kick bar 632 hinges on the structural frame 502 almost in the transverse direction. In the retracted position, the kick bar 632 lies horizontally, with its end pointing to the rear, and its side plate 634 is held against the bottom of the structural frame 502 by the spring 638. The outer part of the side plate 634 exposes out the structural frame 502 at a place where a driver's foot can reach. The spring 638 attaches its front end to the structural frame 502 at a location diagonally upward toward the front from the kick bar hinge, and its rear end to the middle part of the kick bar 632.

To deploy the kickstand 630, the driver kicks the side plate on the kick bar 632 to swing the kick bar downward and then forward until the kick bar slightly passes the hinge's vertical line; the kick bar 632 will rest against a stop plate secured to the bottom of the structural frame 502 and hold in place by the spring 638 as shown in phantom lines in FIG. 34. The hinge of the kick bar 632 slants from the horizontal such that when it is deployed to stand the motorcycle 500 on the ground, the motorcycle 500 will tilt slightly toward the kick bar as shown in FIG. 8.

(6) Battery pack: The main pictorial views are shown in FIGS. 2, 4, and 35 through 60. The success of an electric motorcycle is greatly relied on a good battery pack; hence an improvement to the previous patent includes a battery pack powering the motorcycle 500. Presently, all lithium batteries in the market are prone to explode due to manufacturing defects or in accidents. In the future, it could have non-explosive batteries. By then the packing designs would be much simpler than the concept to be presented here. With the limitation of a narrow width of the motorcycle 500, the battery pack 650 with real dimensions is used to fit inside the motorcycle. The battery pack 650 is installed in a pack box 658 made of nonconductive material. A pack frame 652 secures the pack box 658 inside along with cooling system, and mounts from underneath inside the bottom frame 502 of a motorcycle 500.

The battery pack 650 contains 800 cylindrical type lithium-ion batteries 664 to form forty modules connected in series, with each module containing twenty batteries connected in parallel. The size of the battery is 21 mm (millimeter) in diameter and 70 mm in length, and each battery should have an electric capacity of about 5 Ah (Ampere-hour) with a nominal voltage of 3.7. Therefore, the battery pack 650 could provide about 15 kWh (kilo-Watts hours) of electric energy with 148 volts, adequate for general commuting. Alternately, the battery pack 650 could have eighty modules connected in series with each module containing ten batteries connected in parallel to create a more powerful and efficient 296 volt battery pack 650. If the safety of handling the motorcycle is not a problem, the 296 volt package is definitely a better choice.

The cylindrical battery 664 is to be made special without the typical heat and pressure protecting device under its cap, instead its positive tab welds directly to the positive cap to enhance heat dissipation. Therefore, the protruded round head of the cap and the width of the tab should be made as large as possible to increase their contact area when welded together. The cooling system in the battery pack 650 will prevent the batteries 664 from overheating. The cylindrical casing of the battery is negative. Other types of batteries may be used.

Battery Module:

The twenty cylindrical batteries 664 of each module 662 are placed in two rows with positive heads facing up. The batteries 664 on each row are equally spaced providing a gap between two adjacent batteries for thermal expansion and assembly allowances. The second row of the module 662 locates on the side of the first row with the same spacing.

There are ten longitudinal compartments in the pack box 658. Each compartment contains four modules laid in a row, two inner modules and two outer, connected in series. Each inner module 662 has a conductive positive strip 666 with a width slightly narrower than the distance between the outer edge of the battery caps on the first and second row of the batteries 664. The positive strip 666 is placed on the top of the positive caps and welded to every cap of the batteries. The head end of the positive strip 666 overhangs slightly beyond the module 662 for connecting to the negative strip 670 of the module placed ahead, and its tail end ends slightly short at the outer edge of the last batteries on the module 662. There is a sheet of insulator 668 placed between the positive strip 666 and the top of battery's cylinder walls to prevent short circuiting. The insulator 668 also works as a cushion when the pack cover 657 is placed.

The negative strip 670 of the inner module 662 has the same width of the positive strip 666, and has a portion engaged with the bottom of the module, and welded to every battery. The tail end of the negative strip 670 bends upward at the tail end of the module, and then bends toward the next module, having the upper face of the tail end located at the same level of the lower face of the positive strip 666 and slightly overlapping with the positive strip of the next module.

The end part of the negative strip 670*a* of the fourth module in a row inside the pack case and the front part of the positive strip 666*a* on the first module in the next row; both have different shapes from that of the inner modules. The negative strip 670*a* of the fourth module is almost the same as that on the inner modules, but the upper portion of its vertical end extends out laterally and bends around the side of the module and then extends laterally toward the next row as shown in FIG. 55. The front end of the positive strip 666*a* of the first module extends laterally toward its mating negative strip 670*a* and slightly overlaps, as shown in FIGS. 52 and 58.

There is a capsule 672 containing fire suppression agent, placed inside every space surrounded by four neighboring batteries in a module 662. The capsule 672 has four concave sides to engage with the batteries 664 and a height equal to the cylindrical wall of a battery 664 as shown in FIG. 56. It is made of elastic material, and wrapped its four sides and bottom with aluminum foil to snug fit with the batteries 664 enhancing heat dissipation. Therefore, each module 662 has nine capsules 672, and using conductive glue each capsule is glued its bottom to the negative strip 670. If any batteries overheat and catch fire, the capsules 672 will be melted to release their fire suppression agent to suppress the fire before the fire spreading.

There is a sheet cushion 669 placed on each side of the negative strip of each module 662 and glued to the bottom of the batteries as shown in FIG. 53. Therefore, each inner module 662 comprises twenty cylindrical batteries 664, a positive strip 666, an insulator 668, a negative strip 670, nine capsules 672, and two cushions 669, as shown in FIG. 53. The fourth module in a row inside the pack box 658 uses the negative strip 670*a*, and the first module in the next row uses the positive strip 666*a*. The positive strip 666 of the first module in the first row of the pack box 658 and the negative strip 670 of the last module in the tenth row extend out the pack box 658 and connect to the power system of the motorcycle 500.

Pack Box:

The pack box 658 is rectangular shape with the long side laid in the longitudinal direction, and consists of a pack case 655 and a pack cover 657, secured together with screws. The underside of the pack cover 657 and the upper side of the base plate of the pack case 655 individually have ten equally-spaced longitudinal trenches with open end at the rear. Each trench on both pack case 655 and pack cover 657 is for accommodating a flat coolant hose 684. The flat portion of a coolant hose 684 has the same width as the positive strip 666 on the modules 662. After the assembly in the pack box 658, a coolant hose 684 will contact with all positive strips and negative strips of the four modules in the row. There is no vertical wall on the rear edge of the pack case 655.

In the middle of the bank between two adjacent trenches in the pack case 655, there is a partition wall. Hence, the pack case 655 has nine partition walls and two side walls to create ten compartments for installing the modules 662. The first compartment is located by the right wall and the tenth compartment by the left wall. Along each partition wall, there are two outer position posts and three inner position posts for confining every module on its four corners, as shown in FIGS. 38 through 41. Each outer post has two concave circular faces, and each inner post has four. In the same longitudinal locations, the inner faces of the right and left walls of the pack case 655 individually have two outer position posts and three inner position posts. Each wall outer post has one circular concave face and each wall inner post has two.

There is a vertical slot on the side of each inner post, and each pair of the slots facing each other in a compartment is for placing a separator 676 preventing two adjacent modules from contacting. In the inner side of the front wall of the pack case 655, there is a vertical slot in each compartment for installing a hose guide 678. The hose guide 678 has a 90-degree round corner on its top and bottom allowing a coolant hose 684 to bend while retaining its shape.

The screws for mounting the pack case 655 and the pack cover 657 together are individually located on each of the inner posts, and the front and rear ends of partition walls. At each screw connection, the pack cover 657 has a step hole and the pack case 655 has a metal insert with a blind female thread hole, for installing a socket head screw.

Figure 42:
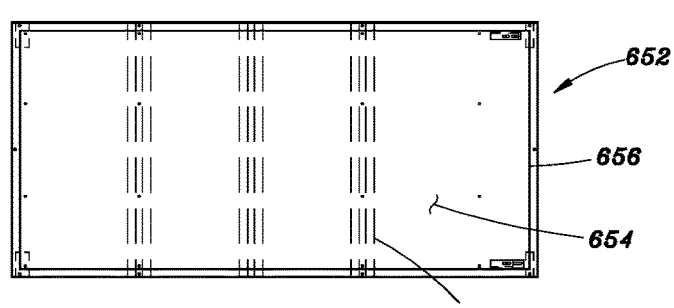
FIG. 42 is a top view of the pack frame.
Figure 43:
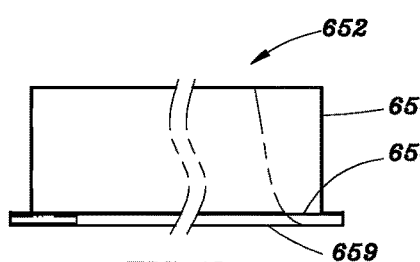
FIG. 43 is a partial front view of the pack frame.
Figure 44:
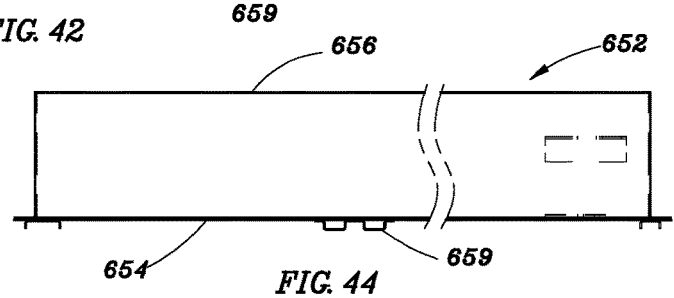
FIG. 44 is a partial side view of the pack frame.

Pack Frame:

The pack frame 652 is fabricated with sheet metal. It has a rectangular base plate 654 with its longer side laid in the longitudinal direction. A formed angle bar 656 has its short leg welded to each side of the base plate 654 with the edge of its short leg positioned at the edge of the base plate 654. The screw holes for mounting the pack frame 652 on the structural frame 502 are located on the angle bars 656. In order to reduce the deflection of the pack frame 652, on the locations where each pair of mounting holes across the width of the pack frame 652 is located, there is a stiffening beam 659 welded to the bottom of the base plate 654 as shown in FIGS. 42, 43, and 44. There is a pair of angle bars each with two slot holes, individually mounted on the inner face of the right and left angle bars 656 near the rear end of the pack frame 652 for mounting a coolant inlet manifold 686. There is also a pair of flat plates, each with two thread holes, individually mounted on the base plate 654 at the locations right below the angle bars, for mounting a coolant outlet manifold 688.

The pack case 655 mounts on the base plate of the pack frame 652, with its front side positioning close to the front angle bar of the pack frame. The space between the rear end of the pack case 655 and the rear wall of the pack frame 652 is for installing cooling manifolds and fittings connecting to the structural frame 502. The locations of installation screws between the pack case 655 and the pack frame 652 are the same as that on the pack cover 657, but requires fewer screws. Every screw installation must be waterproof.

Cooling Hose Assembly:

The cooling hose assembly contains an inlet manifold 686 with an inlet elbow, an outlet manifold 688 with an outlet elbow, and ten identical flat coolant hoses 684. The hoses 684 are equally spaced and individually connect one end to the inlet manifold 686 and the other to the outlet manifold 688. Both manifolds mount in the pack frame 652 behind the pack box 658, with the inlet manifold 686 placed above the outlet manifold 688 as shown in FIGS. 48 and 49.

Pack Frame Assembly:

The forty modules 662 are to be electrically connected in series to form the battery pack 650. The assembly of the battery pack 650 in the pack box 658 should be done in the following sequence. First, mount the pack case 655 in the pack frame 652. Mount the outlet manifold 688 in the pack frame 652, and then lay the hoses 684 in the trenches of the pack case 655. Temporarily lay the rest of the hoses and the inlet manifold 686 on the front side of the pack case 655. Install the separators 676 and the hose guides 678 in place, except the separator 676 at the rear end of the tenth compartment.

Place the first four modules in the first compartment of the pack case 655 in order with their head ends facing the rear, and then the second four modules in order in the second compartment with their head ends facing the front. The rest of modules are installed in the alternating pattern. Finally, install the last four modules in the tenth compartment with their head ends facing the front. Weld all the overlapped strips between modules together to complete the series connection of the battery pack 650. The positive strip of the first module in the first compartment and the negative strip of the last module in the tenth compartment are connected to the electrical cord for powering the motorcycle. Place the last separator 676 at the rear end of the tenth compartment.

Flip the coolant hoses 684 being laid aside, over the top of the positive strips of the modules 662, and secure the inlet manifold 686 on to the pack frame 652. Adjust the tension of the hoses 684 as necessary by moving the inlet manifold on its mounting slot holes. Finally, mount the pack cover 657 on the pack case 655 with screws. The insulator 668 and the cushions 669 on each module 662 should be compressed slightly to ensure that the module 662 is adequately held tight under the cover 657.

Two female coolant connectors 690 are mounted with screws individually on the horizontal leg of an angle bar 692, which has its vertical leg mounted with screws on the rear wall of the packing frame 652. Using fittings and hoses, the inlet manifold 686 and the outlet manifold 688 are connected to the female connectors 690. An electrical receptacle 691 is also mounted with screws on the same angle bar 692. The electrical receptacle 691 is electrically connected to the positive strip on the first module of the battery pack 650 and to the negative strip on the last module. In the same manner, two male connectors 694 and an electrical plug 693 are mounted with screws on another angle bar 696, which is secured with screws to the rear wall of the structural frame 502 housing the pack frame 652. They are shown in FIGS. 46 and 50. The connections between the female and male connectors and between the electric receptacle and plug are detachable by axial forces. Therefore, a pack frame assembly 680 contains the pack frame 652 and all parts mounted on it, including the pack box 658 with the battery pack 650 inside, the coolant hoses, and the female connectors.

Figure 45:
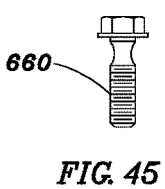
FIG. 45 is a side view of the pack frame mounting screw.

Using screws 660 and a waterproof gasket covering the angle bars 656 on the four sides of the pack frame, the pack frame assembly 680 is mounted from underneath the bottom of the structural frame 502. And then the angle bar 696, the male connectors 694, and the electric plug 693 are installed on the structural frame 502 from an opening having a cover 695 inside the motorcycle as shown in FIG. 50. Each screw 660 for mounting the packing frame assembly 680 has a round-notched neck under its head as shown in FIG. 45, and is made of temperature sensitive materials, enabling it to have a predetermined strength at ambient temperatures, but to lose its strength drastically at elevated temperatures. When the battery pack 650 explodes in an accident, the screws 660 will break at their neck either by the sheer forces of the explosion at the instant, or subsequently be weakened by the heat of the explosion and then break.

Figure 2:
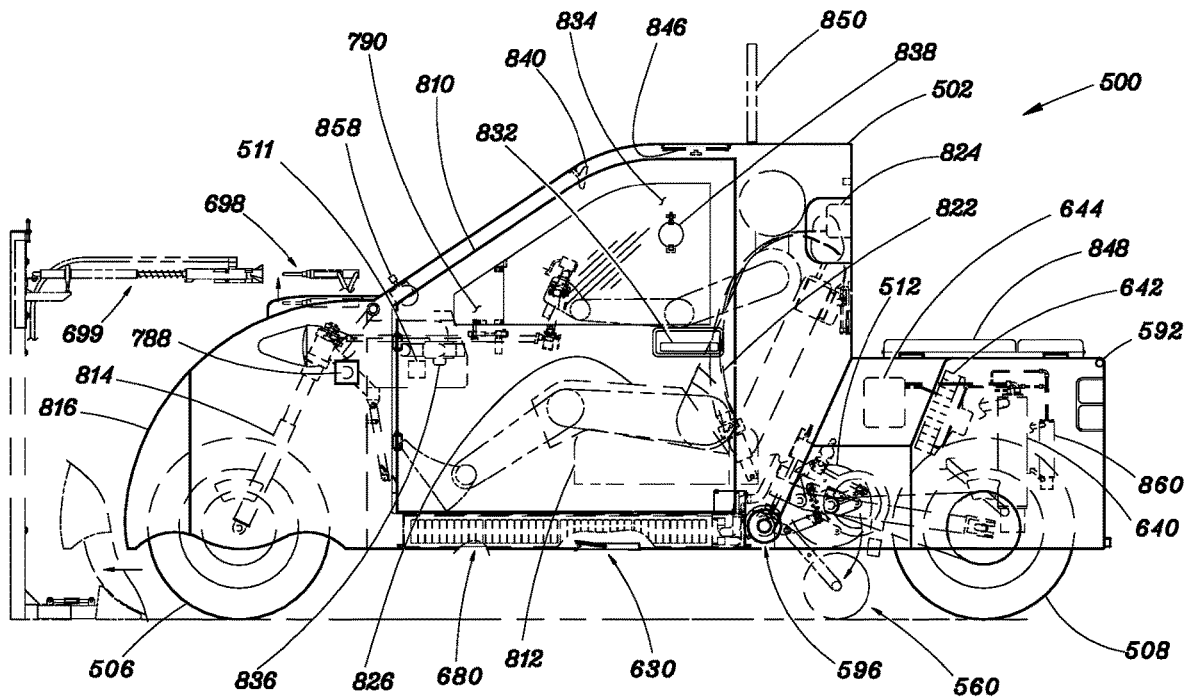
FIG. 2 is a side view of the improved enclosed electric motorcycle in the preferred embodiment. The landing wheels in the extended positions and the installed tipping lever are shown in phantom lines. The male electric engaging device in the raised position and the female electric charging device are also shown in phantom lines.

A cylindrical coolant tank 640 may be mounted vertically in a side well of the rear wheel 508. A refrigerant evaporator and an electric heater, for cooling and heating the coolant are placed inside the tank 640 from above. A coolant pump is mounted on the bottom of the tank 640. A refrigerant condenser 642 with an electric fan may be installed in the same side well, close and parallel to the well's slanted front wall, which has a grille screen opening for entering outside air. A refrigerant compressor 644 may be installed inside the structural frame 502 under the passenger seat 848 as shown in FIG. 2. The cooling system must have coolant temperature sensors on the inlet and outlet ends, and a control valve regulating the coolant temperatures. The sensors and control valve, and other components required for the system are not shown.

(7) Drive-in electric engaging device: The main pictorial views are shown in FIGS. 61 through 74. The drive-in electric engaging device enables a driver to drive a motorcycle to engage its charging device with a stationary charging station and charge its battery pack 650 while parking. The electric engaging device has two parts, a male engaging device 698 installed in the motorcycle 500 and a female engaging device 699 installed on a stationary structure. However, the motorcycle still needs a conventional receptacle 788 to charge its battery pack 650 elsewhere. The conventional receptacle 788 with a spring-hinge cover could be mounted on the structural frame 502 in front of the entrance door as shown in FIG. 1.

Male Engaging Device:

The male engaging device 698 is mounted inside the front wheel cover near the cover's top and in front of the motorcycle windshield. The male device 698 consists of a plug assembly 700, a lifting device, a cover 706 for hiding the plug assembly 700, and an automatic lift reposition device. The plug assembly 700 contains a plug body 708, a cylindrical laser light pointer 710, a round tubular spacer 716, and a flanged cover roller 712 as shown in FIG. 70.

The main part of the plug body 708 is a cylindrical body made of nonconductive materials positioned in the longitudinal direction. On each of its sides at the level of its centerline, the plug body 708 has a trench cast with a metal reinforcing channel bar, starting near its front end. Behind each trench, the plug body 708 has a protruded round base with a thread blind hole in the transverse direction. There are two round sections concentrically extended out from the front end of the main body of the plug body 708. The first round section is the one located at the front end and smaller in diameter but longer in length than the second so that both round sections have about the same circular areas. Each of the round sections has a conductive layer on its surface. The conductive layer on the first round section is for the negative electrode, and the conductive layer on the second round section is for the positive electrode. Extended out from the front face of the first round section is a long conductive round center prong with a round end, to be used as the electrical ground line.

Alternatively, the plug body 708 could have the first round section without the second, and have the conductive layer on the first round section divided along its circumference into two, one for the negative and the other for the positive, and have nonconductive axial gaps separating them. In the same way, if a device requires two negative and two positive electrodes, it could have the two negative electrodes on the first round section and the two positive electrodes on the second round section. Here, the first configuration is used to explain the basic concept.

There is a round three-hole receptacle having male thread and protruding downward from the plug body 708 to engage with a male plug having a female thread coupler 714, for connecting conductive wires to the battery charging system in the motorcycle. The electrodes in the holes of the receptacle are internally connected to the conductive layers on the center prong, the first round section, and the second round section respectively in the plug body 708.

Starting from its rear end, the plug body 708 has a short female thread hole, a deep round blind hole, and then a smaller hole extending through the head of the center prong. The cylindrical laser light pointer 710 is mounted in the blind hole, with its head facing front to have its light beam exiting out from the small hole in the center prong. The laser light pointer 710 is held in place by the tubular spacer 716, which has a male thread end engaged with the female thread hole in the plug body 708. A roller arm 709 mounts on the rear end of the plug body 708 and extends to the right. The cover roller 712 mounts on the right end of the roller arm 709 and positions on the left side of the cover hinge.

The lifting device of the male device 698 comprises a pair of parallel displacement scissor links 702, a motorized worm gear 704 with a screw output shaft, and an actuating rod 726. The actuating rod 726 is a piece of round tubing with inside diameter larger than the screw output shaft of the worm gear 704, and has at one end a thread hole to engage with the output shaft of the worm gear 704 and at the other end a head with a transverse hinge hole. The pair of scissor links 702 is placed individually on each side of the plug body 708. Each scissor link is made of two identical flat bars 718, which hinge together at their middle points. The front end of the inner bars of the scissor links 702 individually supports a roller 720 engaging in the channel on the plug body 708, and the rear end hinges individually on a pair of horizontally laid stationary channel beams 722, which face inward. The rear end of the outer bars of the scissor links 702 hinges individually on the thread holes on the plug body 708, and the front end hinges on a common shaft. The common shaft supports a roller 724 at each end engaging individually in each of channel beams 722.

Figure 61:
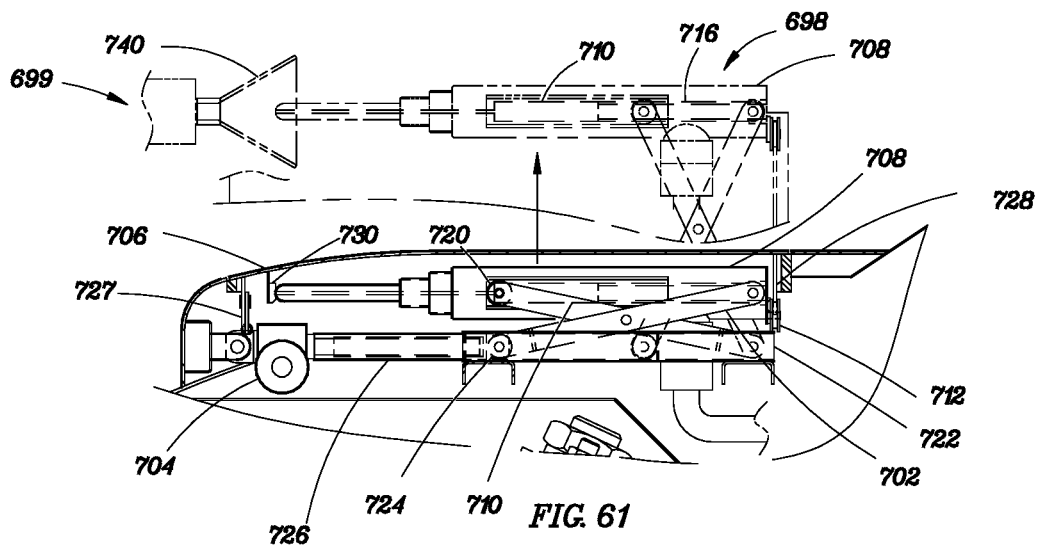
FIG. 61 is a side view of the male electric engaging device in the retracted position. The maximum raised position of the male device and the front part of the female device are shown in phantom lines.
Figure 62:
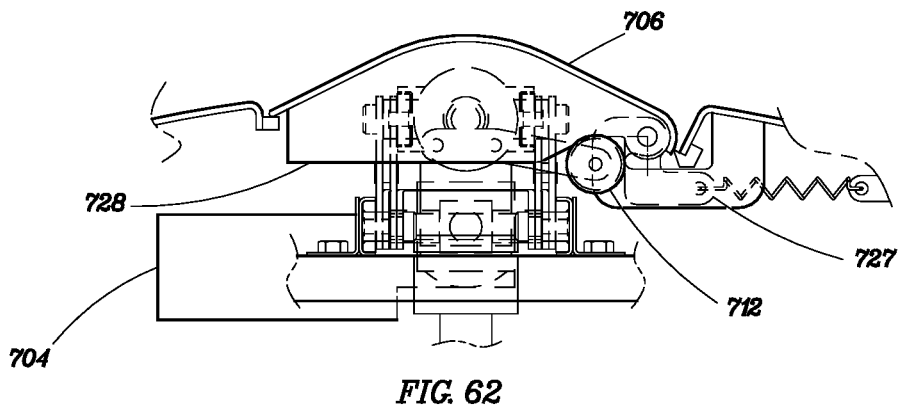
FIG. 62 is an end view of the male electric engaging device in the retracted position. The graduation marked on the rear plate of the cover is not shown for clarity.
Figure 63:
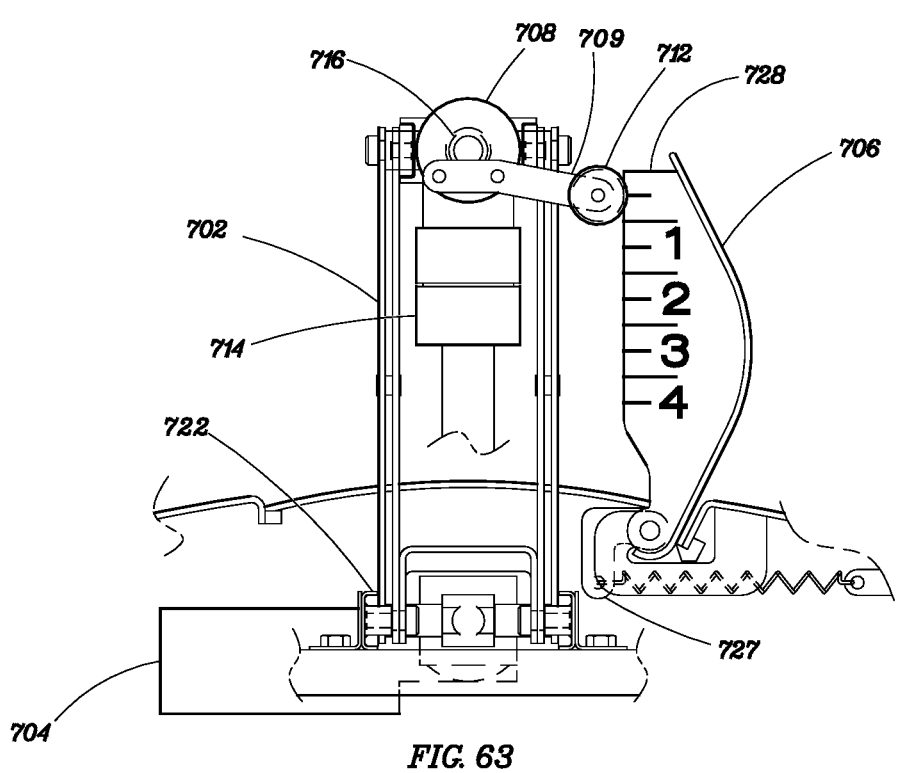
FIG. 63 is an end view of the male electric engaging device in the maximum raised position.

The common shaft hinges at its middle on the hinge hole of the actuating rod 726. Via thread hole, the actuating rod 726 engages with the output screw shaft of the motorized worm gear 704, which is positioned in front of the actuating rod 726 and has its head hinges on the structural frame 502. When the plug body 708 is at its lowest position, the thread end of the actuating rod 726 will stop against the shoulder of the worm gear housing 704 as shown in FIG. 61.

The cover 706 of the male device 698 has two transverse vertical plates, front plate 727 and rear plate 728, underneath to hinge its right edge longitudinally on the structural frame 502. The front plate 727 has an extended arm attaching to a tension spring anchored on the structural frame 502, keeping the cover 706 in the closed position. The rear plate 728 is positioned to have its lower edge engage with the cover roller 712. The lower edge of the rear plate 728 has two parts, a slope edge starting at the same level as the hinge center of the cover 706 and then a horizontal edge. The horizontal edge is below the hinge center with a vertical distance equal to the horizontal distance between the hinge center and the cover roller's outer edge. The beginning and end of the slope edge is round corner for smooth rolling action. With the cover 706 in the closed position, the cover roller 712 is positioned slightly below the beginning of the slope edge.

With the plug body 708 in the lowest position, as the output screw of the worm gear 704 rotates, it pushes the actuating rod 726 to move the pair of scissor rollers 724 in the channel beams 722 toward the rear forcing the scissor links 702 to raise the plug body 708. Meanwhile the cover roller 712 engages with the slope edge of the rear plate 728 to tilt the cover 706 upward. As soon as the cover roller 712 reaches the beginning of the horizontal edge of the rear plate 728, the cover 706 has tilted to the vertical position and subsequently stays in that position. When the plug body 708 reaches the maximum height, the scissor rollers 724 will hit a stop respectively mounted on the channel beams 722.

In order to let a driver know the height of the plug body 708, a graduation is marked on the rear face of the rear plate 728 with color paint for easy reading. The cover roller 712 is also painted in color and to be used as a pointer. As an example shown in FIG. 63, where the plug body 708 is at the highest position, the line on the rear plate 728 located at the cover roller 712 is zero. Below the zero location, the face marks the numbers 1, 2, 3, and 4 in half inch spacing. The location 2 means one inch below the maximum height. To aid a driver reading the graduation, an illuminating light may be installed. There is a prong cover 730 made of soft materials to cover the front end of the center prong keeping the laser beam hole clean, when the cover 706 is in the closed position. The prong cover 730 is supported by a metal strip secured to the underside of the cover 706.

Female Engaging Device:

Since the female engaging device 699 faces toward the motorcycle, the front in all descriptions of the female engaging device 699 means the side facing the motorcycle. The female engaging device 699 comprises a receptacle assembly 732, and a receptacle support 734. The receptacle support 734 supports the rear end of the receptacle assembly 732, enabling the receptacle assembly to overhang to reach the male engaging device 698 in the motorcycle 500. The receptacle assembly 732 consists of a receptacle body 738 and a guiding device. The guiding device comprises a set of three identical conical face segment heads 740, three locking arms 742, three crossbars 743, three tension springs 741, a round lock head 744, a lock head spring 746, and a receptacle end plate 748.

The main part of the receptacle body 738 is a nonconductive cylindrical body pointing toward the motorcycle. Starting from its front face, the receptacle body 738 has a round second hole section followed by another smaller but longer round first hole section, and then a small blind hole, all to mate with their counterparts on the plug body 708. There is a conductive layer made of spring-grade materials on the circular surface of each hole section. Each conductive layer concaves slightly inward, enabling it to firmly engage with its mating part. The conductive layer of the blind center hole is the ground line, the one on the first hole section is the negative electrode, and the one on the second hole section is the positive electrode. There is a round three-hole receptacle having male thread, protruding upward from the receptacle body 738 to engage with a male three-prong round plug having a female thread coupler 714, for connecting an electric cord to a stationary charging station. The electrodes in the holes of the receptacle are individually connected internally to the conductive layers on the center hole, the first hole section, and the second hole section in the receptacle body 738.

The rear end of the receptacle body 738 has a concentric blind hole to accommodate the lock head 744 and the spring 746, and a through hole connecting to the blind hole at the front end of the receptacle body 738. At the rear face of the receptacle body 738, there are three equally-spaced axial blind thread holes. Each blind thread hole is located in a base protruding out the outside surface of the receptacle body 738. One of the threaded holes is located right below the receptacle body 738.

The lock head 744 has a round probe rod at its front end, and is placed inside the rear hole of the receptacle body 738, with its probe rod placed through the through hole of the receptacle body. The rear part of the lock head is round and slide fits with the receptacle body 738 and its front part has a conical taper engaging with the lock arms 742. The probe rod of the lock head 744 is nonconductive, and has a diameter slightly smaller than the center prong of the plug body 708. The end of the probe rod is concave to mate with the round end of the center prong. The receptacle end plate 748 mounts on the rear end of the receptacle body 738 using three screws, and holds the lock head spring 746 inside the rear hole of the receptacle body 738 against the lock head 744.

The three identical segment heads 740 of the guiding device are nonconductive and made of hard low-friction plastics. They are placed in front of the receptacle body 738 and supported by the locking arms 742 individually. In the guiding position, the segment heads 740 forms a complete conical face at their front side with a hole at center concentric with the holes in receptacle body 738, to engage with the center prong of the plug body 708. The axial length of the hole formed by the segment heads must be long enough to reduce the binding force during the engagement with the center prong of the plug body 708. One segment head 740 is located right below the receptacle body 738. Behind the face of each segment head 740, at the middle of its circular sector it has a web extending rearward. And at its rear end the segment has a one-third segment round disk with the same radius as the receptacle body 738. The round disk is positioned close to the front face of the receptacle body 738 to work as a cover protecting the opening of the receptacle body 738. At the rear end of the web, it joints with an axially-laid rectangular block positioned above the segment round disk. The rectangular block has an open slot in its outer side to secure the front end of a locking arm 742. The rear end of the rectangular block extends rearward beyond the front face of the receptacle body 738, and its bottom has a concave face to rest on the surface of the receptacle body 738, holding the segment head 740 in the guiding position.

Each locking arm 742 hinges at its middle part on a fork arm protruding from the receptacle body 738. The rear end of the locking arm 742 extends radially toward the center of the receptacle body 738, and has a slope edge resting on the conical face of the lock head 744, locking the segment heads 740 in the guiding position. The receptacle body 738 has three slotted openings, allowing locking arms 742 individually to reach the lock head 744. A crossbar 743 installs laterally on each locking arm 742 at a location between the hinge of the locking arm 742 and the segment head 740. The crossbar 743 extends an equal amount from each side of the locking arm 742, and has a hole at each of its ends to install a tension spring 741, which connects the other end to the crossbar 743 on the adjacent locking arm 742. The tension springs 741 pull the segment heads 740 toward the guiding position. The spring forces should be just enough to do so.

The rear face of the receptacle end plate 748 has a round stub protruded rearward. The round stub has a blind key hole in its center with a shape to fit the front end of an elastic round bar 760. At its front end, the round bar 760 has two parallel faces symmetric on its axis to fit the blind key hole in the receptacle end plate 748, and a thread blind hole at its end. Using a flat head screw the receptacle end plate 748 is secured on the end of the round bar 760, enabling the receptacle assembly 732 to overhang on the round bar 760.

The receptacle support 734 consists of a round bar 760 made of low friction plastics, a compression spring 762, a bushing 764 made of low friction plastics, a piece of metal round tubing 766, a flat crossbar 768, a stop pin 769, a short post 770, an elastic base 777, an eye bolt 782, a mounting frame 773, a tire stop 784, and a stationary frame 775. The mounting frame 773 is a weldment consisting of a vertical channel beam 774, a horizontal square tubular beam 776, and an angle bar 772. The stationary frame 775 is also a weldment consisting of a vertical square tubular beam 786, and a horizontal square tubular beam 785.

The round bar 760 supporting the receptacle assembly 732 was mentioned. The rear end of the round bar 760 places in the center hole of the bushing 764 mounted in the front end of the metal tubing 766. The rear end of the bushing 764 has an open end axial slot to engage with the flat crossbar 768 secured on the rear end of the round bar 760, allowing the round bar 760 to slide in the bushing 764, without swiveling.

Near the rear end of the bushing 764, the stop pin 769 is installed through the metal tubing 766 and the bushing 764, in the direction perpendicular to the slot, holding the bushing 764 and the metal tubing 766 together, and also blocking the round bar 760 from sliding out. The compression spring 762 is installed around the round bar 760, with its front end pressing on the receptacle end plate 748, and its rear end against the bushing 764, holding the round bar 760 in the extended position. The rear end of the metal tubing 766 has a fork arm to hinge transversely on the head of the short post 770. The short post 770 has its bottom vertically hinging on the angle bar 772, which is secured the channel beam 774. The top and bottom hinges on the short post 770 enable the metal tubing 766 to orient to any directions, but not to swivel on its axis.

The channel beam 774 is secured to the vertical beam 786 using two screws, with each screw placed through a slotted hole in the web of the channel beam 774 for the height adjustment of the receptacle assembly during installation. The head of a screw 789 is pointed upwards and welded to the top of the channel beam 774. The upper end of the screw 789 is placed through a hole in a cap plate covering the vertical beam 786 and secured in place with two nuts. The height of the receptacle assembly 732 can be adjusted by using the two nuts.

A rubber tire stop 784 is placed on the floor and has a metal reinforcement at its back including a square tubular beam 783 extended rearward. The rear part of the beam 783 engages in the hole of the horizontal square beam 785, which connects its rear end to the bottom of the vertical beam 786. On their upper faces, the horizontal beams 783 and 785 each have a forked eyebolt mount welded on. One is with a right hand thread eyebolt, and the other a left hand thread eyebolt. Both eyebolts are positioned in line longitudinally and engage with a coupling nut 787, which is secured in place with a jam nut. The positions of the tire stop 784 can be adjusted by turning the coupling nut 787.

The elastic base 777 is a second support holding the metal round tubing 766 at a position in front of the short post 770, and it is a composite consisting of a rigid round collar 778, an inner collar 780, a round elastic disk 779 with a hole, and a short fork arm. The inner collar 780 is placed concentrically inside the rigid collar 778 with the elastic disk 779 positioned symmetrically and bonded to both collars. The inner collar 780 is slide fit with the metal tubing 766. The fork arm mounts on the underside of the rigid collar 778 to hinge transversely on the eyebolt 782. The eye bolt 782 secures its lower end on the upper wall of the horizontal beam 776 using nuts and washers. The horizontal beam 776 connects its rear end to the vertical beam 774. The elastic base 777 allows the metal tubing 766 limited lateral tilt under force.

Before using the electric engaging device, the female device 699 must be installed to a correct height. If there is more than one person using a motorcycle, with the heaviest person in the driver seat, the female device 699 should be installed so that the center of the conical face on the segment heads 740 is the same height as the maximum height of the plug body 708 in the motorcycle. With the plug body 708 set at the maximum height, the driver can drive the motorcycle slowly forward with the landing wheels 578 extended down, and with the guiding of the laser light pointer 710, steer the center prong of the plug body 708 toward the center of the conical face on the segment heads 740. After the center prong of the plug body 708 passes the center hole of the conical face formed by the segment heads 740, it will enter the center hole in the receptacle body 738 and engage with the probe rod end of the lock head 744, pushing the lock head rearward. Just before the first round section of the plug body 708 touching the conical face, the lock head 744 has moved away from the locking arms 742, allowing the center prong to guide the plug body to open up the segment heads 740, and fully engage with the receptacle body 738.

At the position where the male and female engaging devices are fully engaged, the compression spring 762 on the round bar 760 should be slightly compressed, and the front wheel of the motorcycle 500 must rest on the tire stop 784. When the driver leaves the motorcycle 500, the motorcycle will raise back to its own height by its springs. But the receptacle assembly will deflect accordingly, while maintaining the engagement. The weight of the motorcycle on its springs will likely be far greater than an average driver; the amount of sagging due to the driver's weight should be small. If a driver is very heavy, after completing an engagement, the driver could lower the plug body some amount before leaving the motorcycle.

A driver with lighter weight can drive the motorcycle toward the female device 699 with the plug body 708 set at the maximum height, and stop just before the center prong touching the conical face of the segment heads 740, and adjust the height of the center prong to the center of the conical face, and then move forward to engage the device. If the engagement is smooth, the driver may set one of the automatic repositioning buttons for the height. Next time, the driver just needs to press the button before approaching the charging station, the lifting device will automatically rise to the set height. If a driver does not have that option, the driver needs to remember the location of the cover roller 712 on the graduation marked on the cover rear plate 728 shown in FIG. 63. Next time, the driver can set the plug body 708 to the height before engaging the device. If the plug body 708 does not quite line up with the receptacle body 738 before an engagement, the female engaging device 699 will deflect to complete the engagement.

(8) Vent window: The main pictorial views are shown in FIGS. 2, 76, 77, and 78. There is a vent window 790 mounted on each entrance door 810, in front of a fixed window 834. The vent window 790 has a vertical hinge at its rear edge and opens its front side outward with an electric drive. The electric drive consists of a motorized worm gear 792 with a screw output shaft, an actuating rod 794, an actuating arm 796, and a hinge arm 798. All the components driving the vent window 790 also hinge in the vertical direction. As shown in FIG. 78, the actuating rod 794 is a piece of round tubing with inside diameter larger than the screw output shaft of the worm gear 792. The actuating rod 794 has an axial thread hole at one end to engage with the output shaft of the worm gear 792, and a transverse hinge hole at the opposite end.

The main body of the actuating arm 796 is a piece of round tubing with a fork arm at its bottom and a pull arm at its top as shown in FIG. 77. The motorized worm gear 792 mounts inside a horizontal window beam of the entrance door 810 below the vent window 790, with the head of the worm gear hinging on a channel beam secured to the window beam. The screw output shaft of the worm gear 792 points forward and engages with the thread hole of the actuating rod 794, which has its other end hinging on the fork arm of the actuating arm 796. The main tubular body of the actuating arm 796 hinges on the shank of a socket head screw, which secures its bottom thread end to the structure of the window beam. The actuating arm 796 has its upper part extending out above the window beam, and has its pull arm hinging on the hinge arm 798, which has its other end hinging on a bracket mounted on the surface of the vent window 790.

As the worm gear 792 turns from the closed position, it moves the actuating rod 794 to rotate the actuating arm 796 moving the hinge arm 798 to rotate the vent window 790, allowing the front side of the vent window to open. The air will rush dynamically from the opening into the enclosure 504 as the motorcycle is moving. Hence, the vent window does not need to open very wide to have sufficient air flow. The vent window 790 is in the closed position, when the actuating rod 794 is fully extended out, and in the fully open position when the actuating rod 794 is retracted to stop on the housing of the worm gear 792.

(9) Rear window: The main pictorial views are shown in FIGS. 5, and 75. A rear window 800 is located on the rear wall of the enclosure 504 and operated by an electric drive. The rear window has two parts, a screen window 802 of rectangular shape mounted on the enclosure wall 504, and a sliding solid window cover 804 mounted in front of the screen window 802 to cover the screen window. The screen of the screen window 802 is to prevent materials in the enclosure 504 from being sucked out when the window cover 804 is open. A pair of rollers 805 is mounted on each vertical side of the window cover 804 and located near its top and bottom corner to engage with the front inner face of a vertical guides 806 mounted on the enclosure to guide the window cover 804 sliding vertically.

On the front face of the window cover 804, in the middle of its width and near its lower edge, it has a base with a female thread through hole in the vertical direction. A motorized worm gear 808 with a screw output shaft has its head hinging transversely on the structure frame 502 of the enclosure, and its output shaft pointing downward engaging with the female thread hole on the window cover 804. As the worm gear rotates, its screw shaft moves the window cover 804 vertically to open and close the screen window 802. When the motorcycle is moving, the area behind the enclosure 504 has lower air pressures than the surrounding. By opening the rear window the air in the enclosure will be sucked out effectively, increasing circulation.

The following detailed description contains part of the improvements not mentioned in the section of Brief Summary of the Invention, and each of them is also numbered.

(10) Front wheel support: The main pictorial view is shown in FIG. 2. In order to place the battery pack 650 under the driver seat 812, the driver seat has to be raised higher to keep the same ground clearance of the motorcycle 500. The change requires the front wheel shaft to be located higher. That enables the bottom of the shock-absorbing front wheel fork 814 to mount directly on the front wheel axle, simplifying the front end design.

Figure 3:
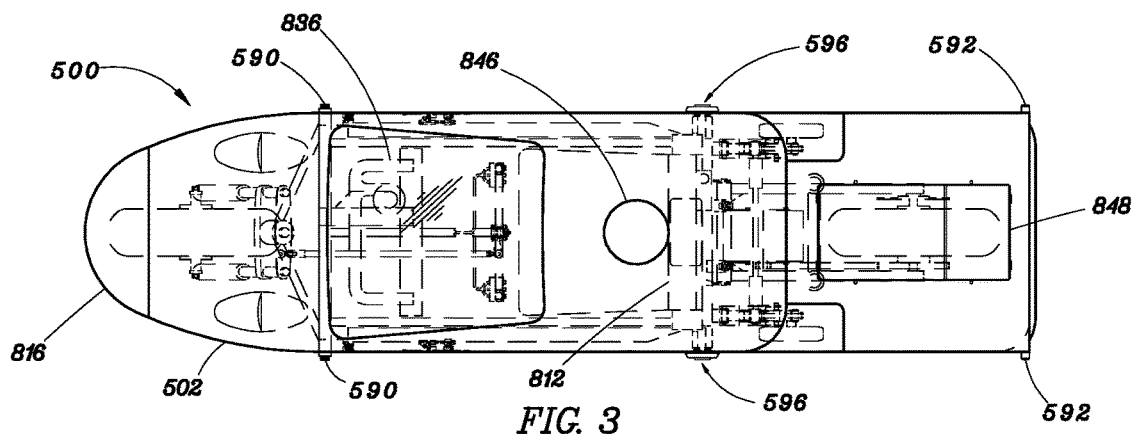
FIG. 3 is a top view of the improved enclosed electric motorcycle in the preferred embodiment.

(11) Front wheel hood: The main pictorial views are shown in FIGS. 2 and 3. The front part 816 of the front wheel hood on the motorcycle 500 is to be made of resilient materials, enabling it to restore its shape after the motorcycle 500 receiving an impact at the front end in minor accidents. The resilient hood 816 will avoid many costly repairs, but the front wheel 506 has to receive the impact as do in the traditional motorcycles. The rigidity of the flexible hood 816 should be great enough to maintain its shape under wind pressures to ensure its performance of reducing the wind drag.

(12) Driver seat and foot pedals: The main pictorial view is shown in FIG. 4. The driver seat 812 remains the same as in the previous patent. It is a seat similar to a driver seat in sedans, capable of sliding its cushion and tilting its seatback for seating adjustments. As part of the improvements, an accelerator foot pedal 818 is added to the right of the brake foot pedal 820, enabling a driver to drive the motorcycle with the same manner as driving a car.

(13) Safety belt and side airbags: The main pictorial views are shown in FIGS. 2, 3, 4, and 82. The inflatable safety belt 822 in the previous patent did not state correctly how it should be implemented and had no detailed description. The inflatable safety belt 822 is to protect a driver during an accident. Under normal driving conditions, a belt retractor 824 will automatically lock the safety belt 822 whenever the motorcycle 500 is decelerating, and unlock again when the deceleration stops. But, when the motorcycle 500 receives an impact while it is traveling, or when it skids sideways on the ground in an accident, sensors 511 will activate to inflate the belt 822 and a pair of side airbags 829 with minimal pressure not causing discomfort to the driver, and lock the belt retractor 824. The belt 822 and the side airbags 829 keep inflated to protect the driver until they are deflated by either the driver or a rescuer pressing a release control button, which also unlocks the belt retractor 824. This manual control is vitally important, because during the skidding the motorcycle still could hit some objects before it comes to a complete halt. With the improved controls, injuries to the driver will be minimized. Crucially, the control button, to release the pressure gas in the inflatable belt and side airbags, must be placed visibly on the control board with a light flashing to expedite driver extrication either by self or a rescuer.

The inflatable safety belt 822 is only the diagonal part covering the upper body of a driver from the right shoulder to the left hip as shown in FIG. 4. The upper end of the inflatable belt 822 joints with a regular seat belt 823 and a flat hose 827. The regular seat belt 823 connects to the belt retractor 824 mounted on the rear wall of the enclosure 504. The flat hose 827 connects to the chamber of an inflator 825 secured on the backside of the seatback, near the top of the seatback as shown in FIG. 82. The lower part of the inflatable belt connects to another regular belt 823. The regular belt 823 loops through the detachable tab of a belt buckle 821 mounted on the left frame of the driver seat 812. And then the regular belt 823 extends to the right attaching to a spring-loaded belt lock 828 secured to the right frame of the driver seat 812. After sitting in the driver seat, the driver only needs to insert the detachable tab into the belt buckle 821 as does an automobile safety belt. If needed, by simply lifting up the belt lock handle, the driver may adjust the regular belt 823. The inflatable belt 822 and the flat hose 827 could be made of the same materials used in an automobile air bag, and fold up flat with permanent creases to become a belt shape, and will restore back to their belt shapes after an accident.

The housings of the side airbags 829 are mounted individually on each side of the seatback, near the top of the seatback. Each of the side airbags 829 is made of the same material used in the inflatable safety belt 822 with crease lines for easy folding to store in its housing, and has a duct 830 connecting to the chamber of the inflator 825. The housing of each side airbag 829 has a front cover, which hinges on its outer edge and closes tight at its inner edge. When the inflator 825 ignites in an accident, it supplies pressure gas to the inflatable safety belt 822 and the side airbags 829 at the same time. The inflated belt protects the front body of the driver instantly. Both side airbags 829 individually force their cover to open, and then inflate frontward to protect both sides of the driver's head and shoulder as shown in FIG. 82. After an accident, each side airbag can be stored back in its housing. But the inflator 825 will be replaced.

(14) Temperature-controlled vest and blanket: The main pictorial views are shown in FIGS. 2 and 83. The air conditioning system used in automobiles wastes too much energy. To maintain driver comfort inside the enclosure 504, the personalized temperature-controlled driver jacket described in the previous patent can maximize the travel range of the motorcycle 500 from the battery pack 650. In order to enhance the driver's mobility, the jacket is to be replaced by a vest 831. The driver vest 831 embeds with a heating element 862. Because cooling the vest with the air is very inefficient, the air ducts described in the previous patent are to be replaced with a pair of flexible tubing 864 carrying coolant. The pair of flexible tubing 864 is laid alongside the heating element 862 as shown in FIG. 83. One of the pair of tubing 864 is laid in reverse direction starting at where the other tubing ends that will cool to the vest 831 more evenly. The heating element 862 keeps the driver warm in cold weather and the tubing 864 circulates cooled coolant keeping the driver comfortable in hot weather. The vest 831 also contains a control 866 and two rechargeable batteries 868 to keep the driver warm elsewhere when not driving. There is a main control in the motorcycle 500 to control both heating and cooling of the vest 831. With the main control set on heating, it provides heat to the vest 831 and charges the two batteries 868 at the same time.

When the weather is very extreme, a removable seat blanket 826 with the same design as the vest 831 may be used to cool or warm a driver's lower body. The blanket 826 is longer and wider than the driver seat cushion 812, spreading from the back of the seat cushion to the front, with Velcro strips attached on its side edges and middle. The middle strip is shorter and starts from the front of the blanket. After a driver sits on the blanket 826, the driver pulls the sides of the blanket to cover the lap and latches the sides together, and then latches the middle. A cylindrical coolant cooling tank 860 may be mounted vertically in the side well of the rear wheel 508, supplying the coolant to both vest 831 and blanket 826. A refrigerant evaporator is installed the inside the tank 860 from the top, and a coolant pump on the bottom. The chilled refrigerant is to be taken from the same refrigerant condenser 642 cooling the battery pack 650. The cooling system must have a temperature control and a control valve regulating the coolant temperatures. The control and control valve, and other components required for the system are not shown. The blanket 826 may either share the same control with the vest 831, or have its own control.

The coolant for both vest 831 and blanket 826 must be dielectric and safe to human body. By connecting to a portable coolant unit to an electric outlet in buildings, the vest 831 and the blanket 826, or a pant with the same design, can also keep any individual comfortable at working or living places in hot or cold weather. And hence the need of the wasteful air conditioning system in buildings can be either greatly reduced or totally eliminated. The portable coolant cooling unit using Peltier thermoelectric modules may be made light and compact.

(15) Drive control: The main pictorial view is shown in FIGS. 5 and 7. To further improve driving safety, two more controls are to be added. when a motorcycle 500 makes a turn on the road and leans sideways to a preset limit, which is set before its anti-skid wheel 596 on the leaning side touching the ground, a drive control 511 will activate to allow the motorcycle maintaining the speed or slowing down, preventing the motorcycle from leaning further to cause self-inflicted accidents.

In addition, the motorcycle 500 must have a low speed cruise control with a preset speed for a driver to drive in congested traffic requiring frequent stops, or drive through an unsafe road section without stopping. The control should have a range of low speeds to reset the preset speed as needed. During driving or stop, as a driver turns on the cruise control, the motorcycle will automatically accelerate or decelerate to the preset low speed at moderate rates, and the landing wheels 578 will automatically extend partially to a preset position as shown in phantom lines in FIG. 5, allowing the driver to concentrate on steering the motorcycle.

During the low speed cruising, by pressing the accelerator foot pedal 818 the landing wheels 578 will automatically retract, allowing the driver to resume normal driving. Instead, by pressing the brake foot pedal 820 the landing wheels 578 will automatically extend fully, allowing the driver to stop the motorcycle. The preset partially-extended landing wheels permit for fully extending quickly to hold the motorcycle as the driver presses on the brake foot pedal, but it should provide reasonable ground clearances for safe steering at the low speeds. A beginner may practice driving the motorcycle, simply by pressing the low speed cruise control button without touching the accelerator foot pedal 818.

(16) Entrance doors: The main pictorial view is shown in FIG. 2. The motorcycle 500 has a pair of entrance doors 810, one mounted individually on each side of its enclosure 504. For driving safety, the pair of the leg doors and their motorized drives mounted individually on each entrance door 810 described in the previous patent, are all eliminated, hence simplifying the entrance door design. The entrance doors can be locked only from outside, but not from the inside, enabling a driver to be rescued from outside in case of an accident. A power lock is installed next to each outside handle 832 to lock or unlock both doors at once, and operable with a key and a remote control. Most of the upper half of each entrance door 810 is a fixed window 834. The vent window 790 mounts in front of the fixed window 834 and has been described in the improvement Number 8. To minimize injuries to a driver in accidents, all the windows on the enclosure should be made of strong clear plastics with abrasive resistant coating, but the windshield could use the same glass used in automobiles, providing a driver excellent visibility for safe drive.

(17) Tipping lever: The main pictorial views are shown in FIGS. 2, 6, 79, 80, and 81. The last part of the improvement is adding a tool, tipping lever 850, to lift a motorcycle up by hand to stand it on an emergency kickstand 630, after an accident resulting in the motorcycle lying sideways on the ground or standing on the anti-skid wheel 596 on the leaning side as shown in FIG. 6. The prying end of the tipping lever 850 is a short round bar with a taper at one end, and a male thread section of larger diameter at the other end. A long round bar is extended out from the male thread section to be used for hand gripping. To protect the prying end of the tipping lever 850, a lever cover 856 is provided. The lever cover 856 is a blind end round tubular section and has a female thread hole at its open end to engage with the male thread section on the tipping lever 850.

A pair of prying sockets 852 for engaging with the tipping lever 850 is individually mounted in the top of the motorcycle 500 near its sides, at where the structure frame 502 is heavily constructed for door engagement. Each prying socket 852 has a female thread at the top and a blind round hole with a taper end at the bottom, all to mate with the prying end of the tipping lever 850. However, the taper end in the prying socket 852 must be deeper than the mating part on the tipping lever 850 to ensure that after the tipping lever is tightened by hand, the taper ends of both parts will engage tightly. There is a socket cap 854 to cover each of the prying sockets 852. The socket cap 854 has a male thread to engage with the female thread hole of the prying socket 852, and a flange at its top for resting on the top of the prying socket 852. The socket cap 854 also has a slot on its top, permitting a blade screw driver to engage for removing it. The tipping lever 850 with its cover 856 and the screw driver should be part of a tool kit stored in the motorcycle 500. Using the tipping lever 850, one person should be able to lift up the motorcycle from the ground by hand to stand on one of the emergency kickstands 630. If needed, another person may assist.

There are many excellent automobile technologies available to apply to the motorcycle 500, especially collision avoidance systems. Therefore, there is still room for improvement.

The following is brief description of parts of the previous patent not mentioned in the improvements, but significant enough to help understand the whole concept of the invention. They are not assigned individually with a number.

Air ventilation: The main pictorial views are shown in FIGS. 2 and 3. There is a duct system 836 allowing the outside air to flow into the enclosure 504. One duct lets the air flow directly in. By pulling a lever, it switches to another duct leading to a power blower, which fans the air in.

Vocal port: The main pictorial view is shown in FIG. 1. A round vocal port cover 838 made of the same material used for the fixed window 834 mounts on each window from inside. The cover 838 hinges at its bottom horizontally and latches its top on the window with a spring-loaded latch. If the latch is released by hand, the cover will swing down to open the port, enabling the driver to vocally communicate with outside. Once swinging back, the latch will lock the cover in place. If needed, the vocal port may be open to help increase air circulation.

Rearview mirror, video monitor, and camera: The main pictorial views are shown in FIGS. 2, 4, and 5. There are two rearview mirrors 840 and a rearview monitor 842, all mounted on the windshield, near its top. With the monitor 842 positioned in the middle of the two rearview mirrors 840 a driver is able to see the whole rearview including both sides. A driver may also use the monitor to get on Internet or play video. A video camera 844 facing rearward mounts on the rear wall of the enclosure 504, near its top.

Top vent cover: The main pictorial views are shown in FIGS. 1, 2, and 3. A round top vent cover 846 mounts on a swivel base secured on the roof of the enclosure 504. The cover 846 hinges on its own edge, and has a knob located under its center. By turning the knob, the cover will pivot on its hinge and open to any amount. The cover can also be rotated to any desired directions by manually turning the swivel base. A parked motorcycle can be effectively cool down in hot weather by opening the top vent cover 846, the pair of vent windows 790, and the rear window 804.

Passenger seat and fold-up cargo compartment: The main pictorial views are shown in FIGS. 1, 2, 3, and 5. A passenger seat 848 is located outside, behind the enclosure 504 of the motorcycle 500 and above the rear wheel 508. The passenger seat has two halves, the front half hinging at its front edge, and the rear half hinging at its rear edge. They are locked in place for seating a passenger. By unlocking and swinging the seats up on their hinges to their vertical positions individually, they will be locked again and unfold a flexible cargo compartment. A pair of retractable handles 849 to be used by a passenger is installed on the rear wall of the enclosure 504, near its top.

Windshield wiper: The main pictorial view is shown in FIG. 2. A motorized windshield wiper 858 is mounted on the lower edge of the windshield to keep the windshield clear in rain.

While the invention has been described in complete detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

ADDENDUM

Enclosed Electric Motorcycle

Element Designation

500 improved enclosed electric motorcycle, 502 structural frame, 504 enclosure, 506 front wheel, 508 rear wheel, 510 rear wheel pivot fork, 512 electric motor, 520 handlebar assembly, 522 steering bar, 524 steering handle, 526 steering shaft, 528 upper housing, 530 lower housing, 531 eye bolt spring, 532 bar locking arm, 533 eye bolt, 534 locking cam, 535 leaf spring, 536 torque arm, 537 connecting rod, 538 stationary bearing, 539 shaft lock, 540 locking arm, 542 leaf spring, 543 circular sector, 544 blind end nut, 545 control board, 546 spherical rod end, 548 upper arm of front wheel support, 560 landing wheel assembly, 562 take-up assembly, 564 take-up rod, 566 compression spring, 568 pivot block, 570 motorized worm gear drive, 572 nut, 574 fork arm, 576 wheel leg, 578 landing wheel, 580 flexible shaft, 590 head of front skid post, 591 protective cover, 592 head of rear skid post, 594 lower skid post, 596 anti-skid wheel, 597 wheel guard, 598 structural tubing, 600 guide collar, 602 bulkhead, 604 post tube, 606 post collar, 608 compres-sion post spring, 610 spring-loaded plunger, 611 needle bearing, 612 electric solenoid, 614 plunger guide, 616 bearing, 618 hub locknut, 620 shaft, 624 hub, 626 tread, 628 wheel body, 630 emergency kickstand, 632 kick bar, 634 side plate, 636 landing plate, 638 tension spring, 640 coolant tank with pump, 642 refrigerant condenser, 644 refrigerant compressor, 650 battery pack, 652 pack frame, 654 base plate, 655 pack case, 656 angle bar, 657 pack cover, 658 pack box, 659 stiffening beam, 660 screw, 662 battery module, 664 cylindrical battery, 666 positive strip, 668 insulator, 669 cushion, 670 negative strip, 672 capsule, 676 separator, 678 hose guide, 680 pack frame assembly, 684 coolant hose, 686 inlet manifold, 688 outlet manifold, 690 female connector, 691 electrical receptacle, 692 angle bar, 693 electrical plug, 694 male connector, 695 cover, 696 angle bar, 698 male electric engaging device, 699 female electric engaging device, 700 plug assembly, 702 scissor links, 704 worm gear, 706 cover, 708 plug body, 709 roller arm, 710 laser light pointer, 712 cover roller, 714 female thread coupler, 716 tubular spacer, 718 flat bars, 720 roller, 722 channel beam, 724 lower roller, 726 actuating rod, 727 front plate, 728 rear plate, 730 prong cover, 732 receptacle assembly, 734 receptacle support, 738 receptacle body, 740 segment heads, 741 tension spring, 742 locking arms, 743 crossbar, 744 lock head, 746 lock head spring, 748 receptacle end plate, 760 round bar, 762 compression spring, 764 bushing, 766 metal round tubing, 768 crossbar, 769 stop pin, 770 short post, 772 angle bar, 773 mounting frame, 774 vertical beam, 775 stationary frame, 776 horizontal beam, 777 elastic base, 778 rigid collar, 779 elastic disk, 780 inner collar, 782 eye bolt, 783 square tubular beam, 784 tire stop, 785 horizontal beam, 786 vertical beam, 787 coupling nut, 788 charging receptacle, 789 screw, 790 vent window, 792 motorized worm gear, 794 actuating rod, 796 actuating arm, 798 hinge arm, 800 rear window, 802 screen window, 804 window cover, 806 vertical guide, 808 worm gear drive, 810 entrance door, 812 driver seat, 814 front wheel fork, 816 front hood, 818 accelerator foot pedal, 820 brake foot pedal, 821 belt buckle, 822 inflatable safety belt, 823 regular seat belt, 824 belt retractor, 825 inflator, 826 blanket, 827 flat hose, 828 belt lock, 829 side airbags, 830 side airbag duct, 831 vest, 832 outside handle, 834 fixed window, 836 duct system, 838 vocal port cover, 840 rearview mirrors, 842 rearview monitor, 844 video camera, 846 top vent cover, 848 passenger seat, 849 retractable handle, 850 tipping lever, 852 prying socket, 854 socket cap, 856 lever cover, 858 windshield wiper, 860 coolant tank, 862 heat element, 864 coolant tubing, 866 heat control, 868 rechargeable batteries.

The invention claimed is:
1. An improved enclosed electric motorcycle of the type having, a structural frame, a front wheel, a rear wheel, an electric motor, a handlebar assembly, a brake foot pedal, an accelerator foot pedal, a battery pack, a pair of extendable lower skid posts, a pair of emergency kickstands, a driver seat, a pair of landing wheel assemblies, with automatic and manual controls to extend the wheels, and an enclosure including a pair of entrance doors, wherein the improvement comprises;
said electric motor directly drives said rear wheel with a chain or a belt, said handlebar assembly employs a pair of steering handles individually mounted on each end of a steering bar for hand steering said motorcycle, said accelerator foot pedal is attached to said structural frame and positioned to the right of said brake foot pedal, allowing a driver to drive said motorcycle with the same manner as driving an automobile, said emergency kickstands are individually mounted on each side of said motorcycle to support said motorcycle on the ground when said landing wheel assemblies fail, said landing wheel assemblies individually have a drive motor, but connected together with a flexible shaft, and said landing wheel assemblies mount directly on said structural frame, and individually have a take-up assembly connecting between a fork arm and a wheel leg to reduce the sprung weights of said landing wheel assemblies, and said lower skid posts individually have an anti-skid wheel mounted on their outer ends to prevent accidents.

2. The improved enclosed electric motorcycle as recited in claim 1, wherein said handlebar assembly further comprises a hand releasable lock on the steering bar for adjusting the orientation of said steering handles, and the hand releasable lock consists of a steering bar with a teeth circular sector, an upper housing and a lower housing fastened together with screws, a bar locking arm, a locking cam with a handle, an eye bolt, a compression spring, and a leaf spring, and the teeth circular sector of the steering bar is positioned inside the upper and lower housing able to rotate with limits but restrained from moving axially, and the bar locking arm hinges its front end on the upper housing and engages with the teeth circular sector, and the locking cam hinges on the eye bolt and locks the rear end of the bar locking arm in the engagement position, and by lifting the locking cam the compression spring lifts the bar locking arm up to disengage with the teeth circular sector allowing the steering bar to rotate for adjusting the orientation of said steering handles, and the leaf spring holds the locking cam in the lock and unlock position.

3. The improved enclosed electric motorcycle as recited in claim 1, wherein said battery pack contains multiple of modules, and each module is made of two rows of cylindrical batteries having all positive heads facing up and welded together with a positive strip and having the bottoms of the cylindrical batteries welded together with a negative strip and having capsules containing fire suppressing agent installed in the vacant spaces in the module to increase heat dissipation and suppress battery fires in an accident, and the modules are placed in multiple rows in a pack box with each row containing one or more modules, and the pack box has a coolant hose in each row engaging with both positive strips and negative strips of the modules in the row to cool or heat the modules.

4. The improved enclosed electric motorcycle as recited in claim 3, wherein said pack box mounts in a pack frame, and the pack frame also mounts the lower parts of connectors for electric wires and coolant hoses, and using screws the pack frame mounts in the bottom frame of the motorcycle from underneath, and the upper parts of the connectors mount on the structural frame of the motorcycle to connect to the lower parts of the connectors, and the connectors are detachable by axial forces, and said screws are made of temperature sensitive alloy and have a predetermined tensile strength at ambient temperatures to ensure that when said battery pack explodes in an accident, the screws will break, allowing said pack frame to eject away from the motorcycle.

5. The improved enclosed electric motorcycle as recited in claim 1 further comprises an electric engaging device consisting of a male engaging device and a female engaging device, and said male engaging device is mounted inside the front wheel hood of the motorcycle, and said female engaging device is mounted on a stationary structure, and the driver of the motorcycle can raise the male engaging device from the motorcycle and drive the motorcycle to engage the male engaging device with the female engaging device for charging said battery pack.

6. The improved enclosed electric motorcycle as recited in claim 5, wherein said male engaging device comprises a plug assembly with a plug body, a lifting device for lifting the plug assembly to higher elevation, a spring-loaded cover for covering the plug assembly, and an automatic lift reposition device, and said plug body has a center prong, a first round section, and a second round section, and said female engaging device comprises a receptacle assembly with a receptacle body, and a receptacle support supporting the receptacle assembly from a stationary structure, and said receptacle body has a center hole, a first hole section, and a second hole section, to engage with said center prong, said first round section, and said second round section to complete the electric connection between the stationary charging station and the battery pack of the motorcycle.

7. The improved enclosed electric motorcycle as recited in claim 6, wherein said lifting device comprises two pairs of parallel displacement scissor links, an actuating rod, and a motorized worm gear with a screw output shaft, and the parallel displacement scissor links have their upper ends supporting said plug assembly and their lower ends attach to the actuating rod, and the motorized worm gear has its screw output shaft engaging with the actuating rod to move the parallel displacement scissor links raising and lowering said plug assembly, and said automatic lift reposition device allows a driver to raise said plug assembly to the correct height by simply pressing the automatic lift reposition device's control button before the engagement between said male engaging device and female engaging device.

8. The improved enclosed electric motorcycle as recited in claim 6, wherein said plug assembly further comprises a laser light pointer, and a cover roller, and said laser light pointer is for guiding the male device toward the female device, and said cover roller is for engaging with a rear plate of said cover enabling the cover to open to the vertical position when the plug assembly is raised, and to close back as the plug assembly is fully retracted.

9. The improved enclosed electric motorcycle as recited in claim 8, wherein said rear plate of the cover further comprises a graduation on the rear face of the rear plate, permitting a motorcycle driver using said cover roller as a pointer to set said plug assembly to correct heights, before an engagement of the male engaging device with the female engaging device.

10. The improved enclosed electric motorcycle as recited in claim 6, wherein said receptacle assembly further comprises a guiding device for guiding said plug assembly into said receptacle assembly before completing an electric engagement, and said guiding device consists of three segment heads, three locking arms, three crossbars, three tension springs, a lock head with a round probe rod, a compression spring, and a receptacle end plate, and the three segment heads form a conical face with a hole at center when in a guiding position, and three locking arms individually support the segment heads, and three crossbars individually mount on the locking arms, and three tension springs individually connect to two adjacent crossbars to restore the three segment heads in the close position, and the lock head engages in the rear hole of the receptacle body for locking the locking arms in the guiding position, and the compression spring presses on the lock head, and the receptacle end plate presses on the compression spring and also connects to said receptacle support.

11. The improved enclosed electric motorcycle as recited in claim 6, wherein said receptacle support comprises a elastic round bar, a bushing, a crossbar, a compression spring, a piece of metal round tubing, a stop pin, a short post, an elastic base, an eye bolt, a tire stop, a mounting frame, and a stationary frame, and the elastic round bar has its front end supporting said receptacle assembly and its rear end engages in the center hole of the bushing, and the crossbar secures to the rear end of the elastic round bar and engages in the axial slot of the bushing, and the compression spring is placed around the elastic round and has its rear end resting on the bushing and its front end pressing on said receptacle assembly, and the metal round tubing has its front end supporting the bushing and its rear end hinges transversely on the short post, and the stop pin secures the metal round tubing and the bushing together, and the short post has its bottom vertically hinging on the mounting frame, and the elastic base supports the metal round tubing at a position in front of the short post, and the eye bolt supports the bottom of the elastic base and its bottom secures on the mounting frame, and the mounting frame secures on the stationary frame, and the tire stop rests on the floor and has its rear end secured to the stationary frame.

12. The improved enclosed electric motorcycle as recited in claim 1, wherein said take-up assembly comprises a take-up rod, a compression spring, and a pivot block.

13. The improved enclosed electric motorcycle as recited in claim 1 further comprises a temperature-controlled vest and a temperature-controlled seat blanket, and both vest and blanket individually contain imbedded heating elements and pieces of coolant tubing, for heating and cooling a driver.

14. The improved enclosed electric motorcycle as recited in claim 1 further comprises an inflatable safety belt, a pair of side airbags, a belt retractor with a regular safety belt, an inflator with a flexible hose connecting to the upper end of the inflatable safety belt and a duct connecting to the side airbags, a belt buckle with a regular belt, a belt lock, an automatic control, and a manual control, and the inflatable safety belt covers the front upper body of a driver, and the inflator and the pair of side airbags are mounted on the seatback of the driver seat, and the belt retractor connects its regular safety belt to the upper end of the inflatable safety belt, and the belt buckle is secured to the seat frame and connects its regular belt to the lower end of the inflatable safety belt and the tail end of the regular belt connects to the belt lock, and the belt lock is secured to the seat frame on the opposite side of the belt buckle and allows the driver to adjust the belt tension, and in an accident the automatic control will ignite the inflator to inflate the inflatable safety belt and the side airbags, and locks the belt retractor, and after the motorcycle coming to a complete stop the manual control allows the driver or a rescuer to deflate the inflatable belt and the side airbags and unlock the belt retractor, and the inflatable belt will restore its shape automatically, and the side airbags can be manually folded back into their housings individually.

15. The improved enclosed electric motorcycle as recited in claim 1 further comprises an automatic control for maintaining or slowing down the speed of the motorcycle to prevent the motorcycle from tipping sideways further, when the motorcycle is making a turn and tilting sideways to a preset limit.

16. The improved enclosed electric motorcycle as recited in claim 1 further comprises a low speed cruise control for automatically accelerating or decelerating the motorcycle to a preset low speed and partially extending the landing wheels to a preset position, enabling the driver to concentrate on steering, and during the cruising, by pressing the accelerator foot pedal the landing wheels will retract allowing a driver to resume normal driving, or by pressing the brake foot pedal, the landing wheels will fully extend allowing the driver to stop the motorcycle.

17. The improved enclosed electric motorcycle as recited in claim 1 further comprises a motorized vent window on each of the entrance doors with the vent window hinging at its rear end and having its front side open outward.

18. The improved enclosed electric motorcycle as recited in claim 1 further comprises a rear screen window with a motorized solid cover sliding vertically to cover and uncover the rear screen window for ventilation control.

19. The improved enclosed electric motorcycle as recited in claim 1 further comprises a pair of prying sockets individually located in the top of the enclosure of the motorcycle, and a tipping lever, permitting a driver to install the tipping lever in one of the prying sockets to lift a motorcycle lying sideways on the ground, up by hand to stand on one of said emergency kickstands.

\* \* \* \* \*